United States Patent
Hieronymus et al.

(10) Patent No.: US 9,542,417 B2
(45) Date of Patent: Jan. 10, 2017

(54) PREFERRED IMAGE RETRIEVAL

(71) Applicant: Eagle View Technologies, Inc., Bothell, WA (US)

(72) Inventors: Will Hieronymus, Woodinville, WA (US); PremKumar Balasubramanian, Redmond, WA (US); Sean Milligan, Redmond, WA (US); Chris Pershing, Redmond, WA (US)

(73) Assignee: Eagle View Technologies, Inc., Bothell, WA (US)

( * ) Notice: Subject to any disclaimer, the term of this patent is extended or adjusted under 35 U.S.C. 154(b) by 137 days.

(21) Appl. No.: 14/092,652

(22) Filed: Nov. 27, 2013

(65) Prior Publication Data
US 2015/0149454 A1 May 28, 2015

(51) Int. Cl.
*G06F 17/30* (2006.01)
*G06K 9/62* (2006.01)

(52) U.S. Cl.
CPC ....... *G06F 17/30268* (2013.01); *G06K 9/6263* (2013.01)

(58) Field of Classification Search
CPC .............. G06F 17/30268; G06F 17/30244; G06F 17/30247; G06F 17/30256; G06F 17/30259; G06K 9/6215; G06K 9/626
See application file for complete search history.

(56) References Cited

U.S. PATENT DOCUMENTS

| | | | |
|---|---|---|---|
| 8,078,436 B2 | 12/2011 | Pershing et al. | |
| 8,088,436 B2 | 1/2012 | Gao et al. | |
| 8,170,840 B2 | 5/2012 | Pershing | |
| 8,209,152 B2 | 6/2012 | Pershing | |
| 2002/0138481 A1* | 9/2002 | Aggarwal et al. | 707/6 |
| 2003/0167263 A1* | 9/2003 | Sasaki et al. | 707/3 |
| 2006/0115108 A1 | 6/2006 | Rodriguez et al. | |
| 2008/0126303 A1* | 5/2008 | Park et al. | 707/3 |
| 2011/0187713 A1 | 8/2011 | Pershing et al. | |
| 2013/0202157 A1 | 8/2013 | Pershing | |
| 2013/0204575 A1 | 8/2013 | Pershing | |
| 2013/0295894 A1 | 11/2013 | Rhoads et al. | |
| 2013/0346020 A1 | 12/2013 | Pershing | |
| 2014/0046627 A1 | 2/2014 | Pershing | |

OTHER PUBLICATIONS

International Search Report and Written Opinion, mailed Feb. 26, 2015, for International Application No. PCT/US14/67173, 7 pages.

* cited by examiner

*Primary Examiner* — James E Richardson
(74) *Attorney, Agent, or Firm* — Seed Intellectual Property Law Group LLP

(57) ABSTRACT

The present disclosure proposes computer-based systems and methods for determining, for an application, the most relevant subset of images across a number of sources of images by identifying images over multiple image providers, aggregating image collection over those images that are candidates for use, evaluating candidate images based on comparing image metadata against customizable image preference criteria, and producing a set of images to be selected either by a user or by a computer for use in the application.

15 Claims, 18 Drawing Sheets

Threshold Sort Embodiment

| | Images | | | |
|---|---|---|---|---|
| Number | Capture Date | Heading | Resolution (inches/pixel) | |
| 1 | 3/5/2007 | Ortho | 6 | |
| 2 | 12/3/2011 | N | 3 | |
| 3 | 4/13/2007 | S | 6 | |
| 4 | 9/19/2011 | E | 1 | |
| 5 | 1/5/2010 | N | 6 | |
| 6 | 6/22/2012 | E | 12 | |
| 7 | 8/10/2008 | W | 12 | |
| 8 | 9/10/2012 | W | 3 | |
| 9 | 1/21/2013 | S | 3 | |
| 10 | 1/9/2013 | Ortho | 12 | |
| 11 | 8/28/2011 | E | 1 | |
| 12 | 12/5/2009 | E | 6 | |
| 13 | 7/8/2011 | N | 1 | |
| 14 | 8/7/2009 | S | 12 | |
| 15 | 4/23/2008 | N | 12 | |

| Image Preference Criteria | Resulting Matches |
|---|---|
| All images with resolution 3 or greater | 2(N), 4(E), 8(W), 9(S), 11(E), 13(N) |
| Return images with resolution 3 or greater, requiring at least one ortho and two obliques with a preference for earliest images | 10(O), 2(N), 4(E), 8(W), 9(S), 11(E), 13(N) |
| All images captured in 2012 or later | 6(E), 8(W), 9(S), 10(O) |
| All images captured in 2012 or later, but at least 2 most recent images for each heading | 1(O), 2(N), 4(E), 6(E), 7(W), 8(W), 9(S), 10(O), 13(N), 14(S) |
| An earliest capture date and latest capture date for each heading | 1(O), 10(O), 15(N), 2(N), 3(S), 9(S), 12(E), 6(E), 7(W), 8(W) |

*Fig. 3*

Image Scoring Embodiment

Example 1: (One Image from a Group of Candidate Images) ⟵ 1503

| Image Attributes | Attribute Value | Attribute Measure | Image Preference Criteria (Weighting Factors) | Score |
|---|---|---|---|---|
| Capture Date | .4 | Age (years) | 0- 0.5 = 100; 0.5-1.5 = 50; 1.5-3.0=10; More than 3.0 =0 | 100 |
| Resolution | 6 | Inches per pixel | 1-3 =100; 4-6=75; 6-12= 10; Greater than 12=0 | 75 |
| Heading (NSEW) | South | Cardinal Direction | n/a | |
| Cost | .45 | Cents per image | 0.0-0.1 = 100; 0.1-0.5 = 80; 0.5-1.5 = 20 More than 1.5 = 0 | 80 |
| Vendor | A | Vendor | Vendor A = 100 All Others = 50 | 100 |
| Total: | | | Total Scores: | 355 |

*Fig. 4A*

Image Scoring Embodiment

Example 2: (Another Image from a Group of Candidate Images)

| Image Attributes | Attribute Value | Attribute Measure | Image Preference Criteria | Score |
|---|---|---|---|---|
| Capture Date | 1.0 | Age (years) | 0 - 0.5 = 100; 0.5-1.5 = 50; 1.5-3.0=10; More than 3.0 =0 | 50 |
| Resolution | 2 | Inches per pixel | 1-3 = 100; 4-6=75; 6-12= 10; Greater than 12=0 | 100 |
| Heading (NSEW) | North | Cardinal Direction | n/a | |
| Cost | .01 | Cents per image | 0.0-0.1 = 100; 0.1-0.5 = 80; 0.5-1.5 = 20 More than 1.5 = 0 | 100 |
| Vendor | A | Vendor | Vendor A = 100 All Others = 50 | 100 |
| Total: | | | Total Scores: | 350 |

*Fig. 4B*

PREFERRED IMAGE RETRIEVAL

BACKGROUND

Technical Field

This disclosure relates to systems and methods used to identify and retrieve relevant images from one or more image sources using customized image preference criteria.

Description of the Related Art

Many companies provide digital images for sale, for lease, or otherwise make images available to customers to use. For example, Getty Images® and Corbis® provide a wide variety of images including images of artwork, people, and landmarks. Microsoft® through Bing® images and Google® through Google images provide a wide variety of satellite images. Pictometry International Corp. captures high resolution aerial images using airplane-mounted cameras and makes those images available for purchase or subscription. Many other providers, including individual photographers, also acquire and provide images and make them publicly available through databases, bulletin boards, social media sites such as Facebook®, Google+® and other forums.

Each of these images typically include image data, for example, data representing individual pixels that make up the visual representation of an image, and metadata that describes information about the image. Metadata of aerial images of ground features may include the date the image was captured, the resolution of the image, the source of the image such as an image vendor or a copyright holder, the position of the camera at the time the image was captured, the latitude/longitude of the camera at the time the image was captured, the latitude/longitude coordinates of the image edges, and so on. Metadata may be associated with an image as a tagged data field or embedded directly into the image data.

Finding the most relevant images to use for a particular task, for example, for analyzing real property or a building on the property, typically involves using individual manual or electronic searches to try to locate where property or building images reside, or to locate the names of image providers likely to have the images being sought.

The searcher may also use an image title, subject matter or other image metadata attributes to search for relevant images across multiple image sources. Once a set of images is retrieved, a manual process is typically used to evaluate each image to select a subset of images that are the most relevant for the task.

BRIEF SUMMARY

The present disclosure proposes computer-based systems and methods for using image preference criteria to evaluate and select a preferred set of images from a number of image sources. Image preference criteria may include general information about the images such as a name or subject, information found within the image data such as color palette or image size, or image metadata attributes such as the date and time the image was captured. Image preference criteria may also include weightings or formulas to be applied to metadata attributes, or other information to identify preferred images.

Applying image preference criteria to information about an image, including image metadata attributes, may be done in many ways. Three different examples are a sort, a threshold sort and image scoring. According to the sort selection mode, the images are sorted into groups based on their metadata. This sort might be to sort all images by type, such as orthogonal and oblique; also a sort by compass bearing, north, south, east or west. Also, a sort by resolution, such as 12 pixels per foot; 9 pixels per foot, 6 pixels per foot, etc. Also a sort by date, most recent to oldest. There are a number of other sorts that can be done. Any image may be placed in more than one sort category, for example, it may be an oblique, a north, a recent image or pixels per foot. With each sort category, such as north, the images may also be sorted by the other criteria, such as a date, resolution, etc. Using a threshold, images are selected by various threshold values applied to information about the image, including image metadata attributes. Using image scoring, a total score for each individual image is calculated by assigning a numerical score for each metadata attribute of an image. In one embodiment, the individual metadata attribute scores may be weighted and are then combined to determine a total score for the image, where the higher score of an image indicates a closer fit to the most relevant images identified by the image preference criteria. In this example, a set of relevant images may be selected from those images whose total scores are above a certain threshold. It is also possible to combine the sort with the threshold to have a threshold sort of all images that meet a selected threshold. In some embodiments, applying an image preference criteria may include a combination of a threshold sort and an image scoring.

Image preference criteria used to evaluate and select images may be stored in a database that contains multiple instances of image preference criteria that is customized, for example, to a specific customer or to a specific application for which the images are to be used. Examples of using multiple image preference criteria are an image-provider company that searches for and provides sets of images to different insurance companies or for a tax assessor. Each insurance company may have a different business model for evaluating underwriting risk and therefore may use different criteria for selecting images to use for analysis and each tax assessor may have different criteria for what is important to view. One company may place a greater value on more recently captured images in contrast to another company that may place a greater value on image resolution. In addition, the two companies may also use different criteria when selecting images for an application other than underwriting, such as for adjusting claims. One company may prefer images no earlier than one year prior to the loss event for comparison; the other company may prefer a greater number of images of the property taken at different oblique angles over the last two years. The insurance companies then use these images to analyze characteristics of buildings on land parcels for policy underwriting, for example.

The present disclosure includes systems and methods for identifying relevant images from multiple image providers, evaluating those images based on comparing image metadata attributes against customizable image preference criteria, and producing a set of preferred images for use. By using these computer-based systems and methods, finding preferred images based on customer image preference criteria can be done quickly and efficiently.

BRIEF DESCRIPTION OF THE SEVERAL VIEWS OF THE DRAWINGS

FIG. 3 is a diagram of a non-limiting embodiment of a threshold sort where threshold values for image preference criteria are used for one or more image metadata attributes and images are selected and sorted by those values.

FIGS. 4A and 4B are diagrams of non-limiting embodiments of image scoring where a numeric value for each of at least two metadata attributes are determined, weighting factors applied, and the resulting numbers combined to achieve a total score for the image.

DETAILED DESCRIPTION

Figure 1:
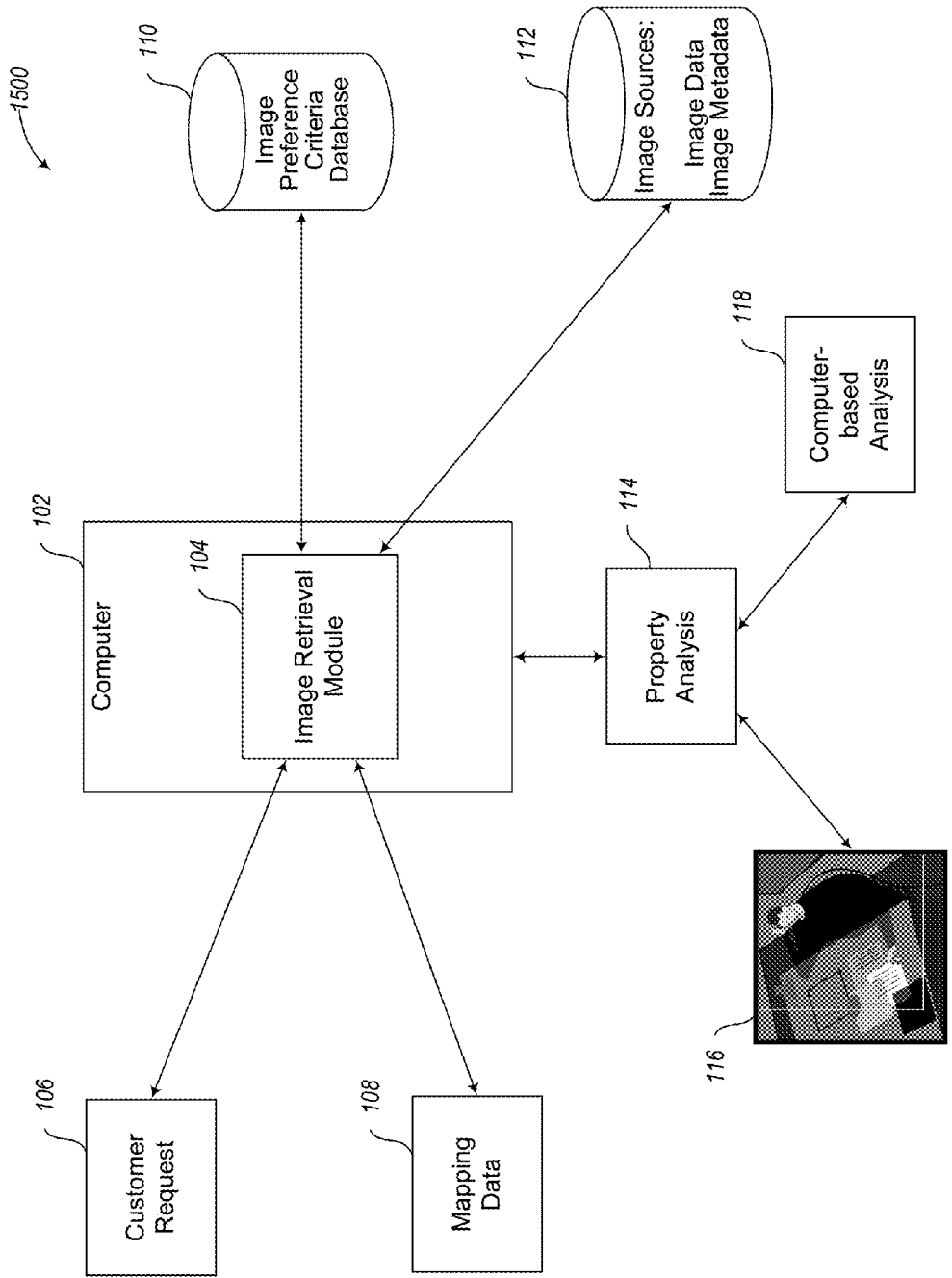
FIG. 1 is a block diagram illustrating example functional elements for identifying and retrieving preferred images, according to one non-limiting embodiment.

FIG. 1 is a block diagram 1500 illustrating example functional elements of one embodiment of an image retrieval system. Over the last several years, there has been a great increase in the number of images available for use and a rapidly increasing variety of applications with which to use them. Sources 112 of these images include satellite imagery, aerial imagery, and ground-based images taken either commercially or by amateurs. Many of these images are widely available and may be accessed either through paid databases, paid subscription services, or be available through public databases or forums such as bulletin board sites, Facebook, Google+, or other Internet and social media sites.

Recent estimates place the number of images available electronically in the trillions. While an image may or may not be unique in terms of the visual data represented, it will usually be unique in terms of image metadata attributes. Image metadata provides information about the image. On the other hand, image data is the information contained in the image itself. As one simple example, there are many cameras today which can take a series of pictures very quickly, such as a burst of three, eight, or a dozen images. If the subject of the photograph does not move between pictures, such as a landscape scene, a family portrait, and the like, the image data from one image to the next will be identical or nearly identical, while the metadata will be different since each image will have a specific timestamp at least and may have a different camera orientation, location, lens setting, or the like. In a similar manner, a home, which is a stationary object on a landscape, might be included in many different images taken from different angles and compass bearings on different days. There will be some common image data in the various images since all the images are of the same roof and the same home, but the metadata for each image will be very different. Examples of metadata attributes include the date and time the image was captured, geolocation (e.g., latitude, longitude) of the camera taking the image, geolocation of the image itself, orientation of the camera, resolution of the image, type of image (e.g., ultraviolet, visual spectrum, infrared), camera heading when the image was taken (e.g., north, south, east, west and orthogonal), image description and the like.

The types of applications 114 that use these images range from artistic applications such as creating a composite image or collage, to business applications such as analysis of a particular location or a building over time. For example, it has recently become possible to improve the accuracy of roof measurements through using multiple aerial images with a computer assisted roof estimation system. It is now possible to obtain actual roof dimensions and generate a roof estimation report without relying on a human estimator to be present at a building site. If a building is significantly damaged, satellite photos or aerial images saved in a database can provide accurate views of the building as it was, prior to a damage incident. Furthermore, if two or more current or previous views of the same roof are available, for example, an orthogonal view and at least one oblique view, a three-dimensional image of the roof can be created with the aid of computers. Such a three-dimensional rendering allows for obtaining actual dimensions of a complex roof that can be used to accurately calculate replacement costs. Such methods are described in U.S. Pat. Nos. 8,088,436 and 8,170,840.

For such an analysis, the selection of the most relevant images for each required orientation in the quickest time at the least cost will provide a significant advantage in terms of decreased analysis time, increased accuracy, greater customer satisfaction and increased profitability. The systems and methods disclosed are applicable to any image-based analysis process, including analysis done by individuals such as claims adjusters or underwriters, analysis done by technical teams, or analysis done by computer-based systems.

In this disclosure, the term "image" includes all physical and electronic forms of images such as photographic images, video images, sketches, drawings, paintings, ultraviolet, visual range or infrared images, radar images, and/or any other graphical representation or depiction of an object.

The term "image preference criteria" refers to any kind of attribute, characteristic, or other measure that may be used to evaluate one image as preferred over another image. A subset of these criteria may include metadata attributes associated with an image or embedded into image data. The criteria may in some cases also be expressed as a threshold value for one or more individual pieces of information, a numeric score, a reliability factor, or as a function taking as input one or more individual pieces of criteria or other information. Different ways of expressing these values for criteria and giving some more or less weight may be referred to as "weighting factors."

An example of a non-limiting embodiment is a system shown by diagram 1500. An image retrieval module 104 runs on computer 102 and is used to identify available images from image source database 112, to apply and provide the images to an application 114, for example, property analysis for insurance underwriting. A customer request 106 is received by the image retrieval module 104. The customer request 106 may take various forms for identifying an object to be analyzed. For example, if the customer wants to create a three-dimensional model of a building, the location of the building may be identified in a number of ways. If the location identifier is a street address, the address is located by the image retrieval module by using mapping data 108. If the address is unable to be located, the closest matching address may be presented to the user to confirm whether this is the correct address to use. If the location identifier is given in a geocoded form (latitude, longitude), the mapping data 108 will locate any image of that latitude and longitude. If it is in a city or on a street, it is able to render the correct address and provide the verified address to the image retrieval module 104. There may be other ways besides these listed to identify the location of a building. For example, selecting the building by clicking on a photograph or other image, giving the name of the building or a person who lives in the building, or any other technique.

An image preference criteria database 110 stores image preference criteria for selecting preferred images from various image sources. These preferences may be stored in various forms in various embodiments, including preferences associated with individual customer requirements or for individual applications requiring images. Preference criteria may involve a wide set of factors including, but not limited to, where to search for images, metadata attributes associated with one or more images including type of image, resolution of the image, date of the image, geolocation of the image, and so on. In one or more embodiments, these preference criteria may be in the form of specific numbers, while in other cases it might include threshold values for image metadata attributes. In other embodiments, the preference criteria may be expressed as weighting factors applied to one or more image metadata attribute values, or may be expressed as a function of image metadata attribute values which determines a score for individual images or sets of images.

When evaluating the metadata attributes between two images to determine the most preferred, image weighting factors might be used, but this is not done in some embodiments. Weighting factors given to each metadata attribute may be dramatically different depending upon, for example, general customer preference, the method used to analyze the image, and the intended use of the image.

For instance, if the image will be used by an underwriter to evaluate property to determine a set of insurance products and prices available for the property, more recent images of the property and buildings as well as higher resolution images may be more desirable and therefore more heavily weighted. For example, if the underwriter only wants to look at general features of the property the underwriter may prefer a super-high resolution image that is in black and white or has a slight distortion. If the images will be used to determine building characteristics, for example, roof measurements or walls measurements, non-distorted or corrected images are used that are taken from different angles or that may be taken in the wintertime when there will tend to be less foliage on trees blocking a view of the property may be more desirable and therefore more heavily weighted.

If a company is providing image retrieval services for a number of different customers, the company would receive individual image preference criteria for each customer, as well as for each of the customer's applications, and store that information in the image preference criteria database 110. The individual image preference criteria may be received from a customer in the number of different ways including, but not limited to, through the customer's policy and review manuals or through customer meetings to determine individual image requirements. The individual image preference criteria may also be modified over time either directly by the customer or through an evaluation process that may occur in either a manual or automated fashion, where changes in image preference criteria are associated with increased quality of the output derived at least in part from the images that are selected. This evaluation process may include using statistical methods. For example, variations in preference criteria, such as image source, image resolution, and orientation of camera, may be correlated to a quality assessment of the output such that statistical significance can be attributed to the effect of individual variations to each preference criteria. For example, insurance underwriters may see a correlation between the risk exposure of certain policies and the characteristics of images used in the process, and modify preference criteria accordingly. It is important to note that for each customer who receives a set of relevant images, even for customers in the same businesses, the individual weighting factors for each customer within the image preference criteria database 110 will likely be different.

Image sources 112 represent one or more locations from which images may be retrieved. Image sources may include, for example, private databases, subscription services such as Pictometry, Google Images, or Bing maps. Sources may include public databases or forums such as Facebook, Google+, and the like where images are generally available to the public. These image sources typically provide image data, which, for example, may represent individual pixels, or vector-based information that is used to construct an image; and metadata attributes that describe information about the image such as type of image, resolution of the image, date of the image, location of the image, and so on.

Property analysis 114 represents an example application that uses the selected images. In one example, property analysis can be conducted through individual technicians 116 that visually examine multiple images and use software to create a three-dimensional model of buildings on the property. In this example, the image retrieval module 104 will identify various orthogonal (top-down) and oblique images to provide the technician 116 with the desired number of images that can be used to accurately create the three-dimensional model.

As one example of this, home insurance companies may have different image preference criteria. One company may weight more highly the date the image was taken while another company may weight more highly the season of the year or time of day the image was taken. Yet another company may weight more highly a street view image over an aircraft or satellite image. A different customer, such as a county tax assessor, might weight a range of dates as most important and wish to get multiple images of the home taken at least one year apart and over a range of at least five years, with preference for a first image as the most recent image and the second image as the oldest available image of a particular property.

In another example, computer-based analysis 118 can be used to identify and cross-correlate specific points in a structure so that the three-dimensional model may be created. In one example, a customer request 106 for an initial image search is processed by the image retrieval module 104 using image preference criteria stored in database 110 requesting oblique and orthogonal images for a property location. Thirty images are returned: six orthogonal images and twenty-four oblique images including sixteen compass obliques (three west, four east, six north and three south) and eight other oblique images that are somewhere in between. If the application desiring images requests one orthogonal and one of each of the four compass obliques, the highest ranking image from each of those compass viewpoints will be selected, even if the highest ranking east image may rank lower than all of the other oblique images. However, a different application may want all images that exceed a certain score threshold irrespective of their viewpoint or compass direction. In such a case, the system would return five of the six orthogonal images and all of the obliques except most or all of the east view images that did not score highly due to low image resolution. These retrieved, preferred images are made available for computer-based analysis 118, or operator analysis 116, using the preferred images with the desired image metadata attributes sorted by the highest score, where preferred images having lower scores are available if additional or alternative images are desired.

Figure 2A:
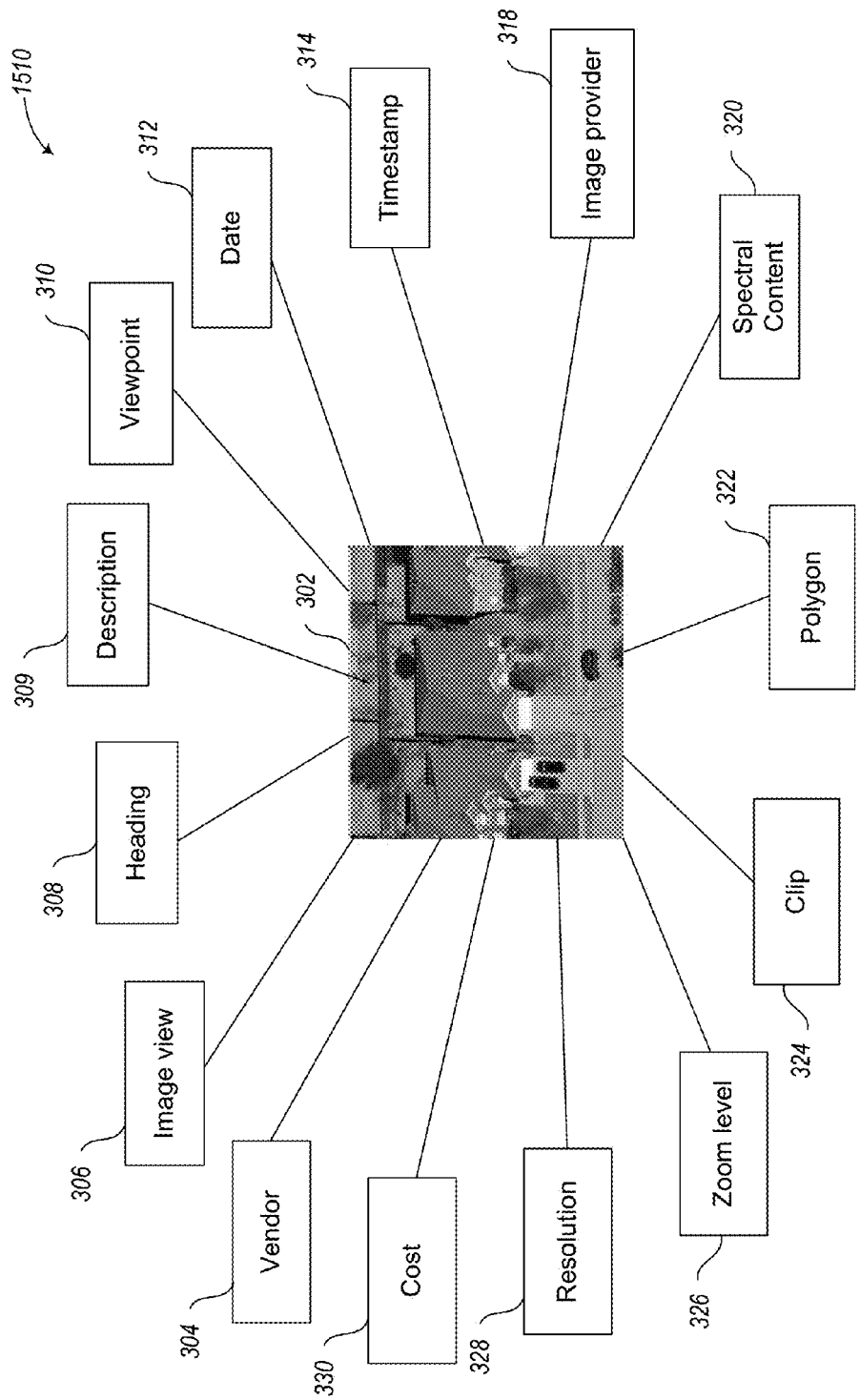
FIGS. 2A through 2C are diagrams illustrating various example image metadata attributes and how these attributes are used in image preference criteria, according to one or more non-limiting embodiments.

FIG. 2A is a diagram illustrating an example 1510 of multiple metadata attributes that may be associated with an image, according to one non-limiting illustrated embodiment. Examples of metadata attributes include: a vendor field 304 identifying where the image was purchased; an image view 306 describing the orientation of the camera or other capture device at the time the image was captured; a heading field 308 describing a heading direction, such as north, south, east, west, or orthogonal; a description field 309 containing a brief text description of the image; a viewpoint field 310 describing the orientation of the camera such as, for example, orthogonal, oblique, or street level; a date field 312; a timestamp field 314, describing the date and time the image was captured; an image provider field 318 describing who captured the image; a spectral content field 320 describing whether the image is, for example, of the visible, hyperspectral, or infrared spectrum; a polygon field 322 describing the foot print polygon captured in the image, which may be represented by geocoded coordinates for the vertices of the image data; a clip field 324 describing a subset image within a larger image, which may include polygon information of its own; a zoom level field 326 indicating the zoom level the camera was set on when the image was captured; a resolution field 328, which may be measured in pixels per inch, and a cost field 330 describing the cost to purchase or license the image. These are examples; other fields with different metadata might also be used.

Figure 2B:
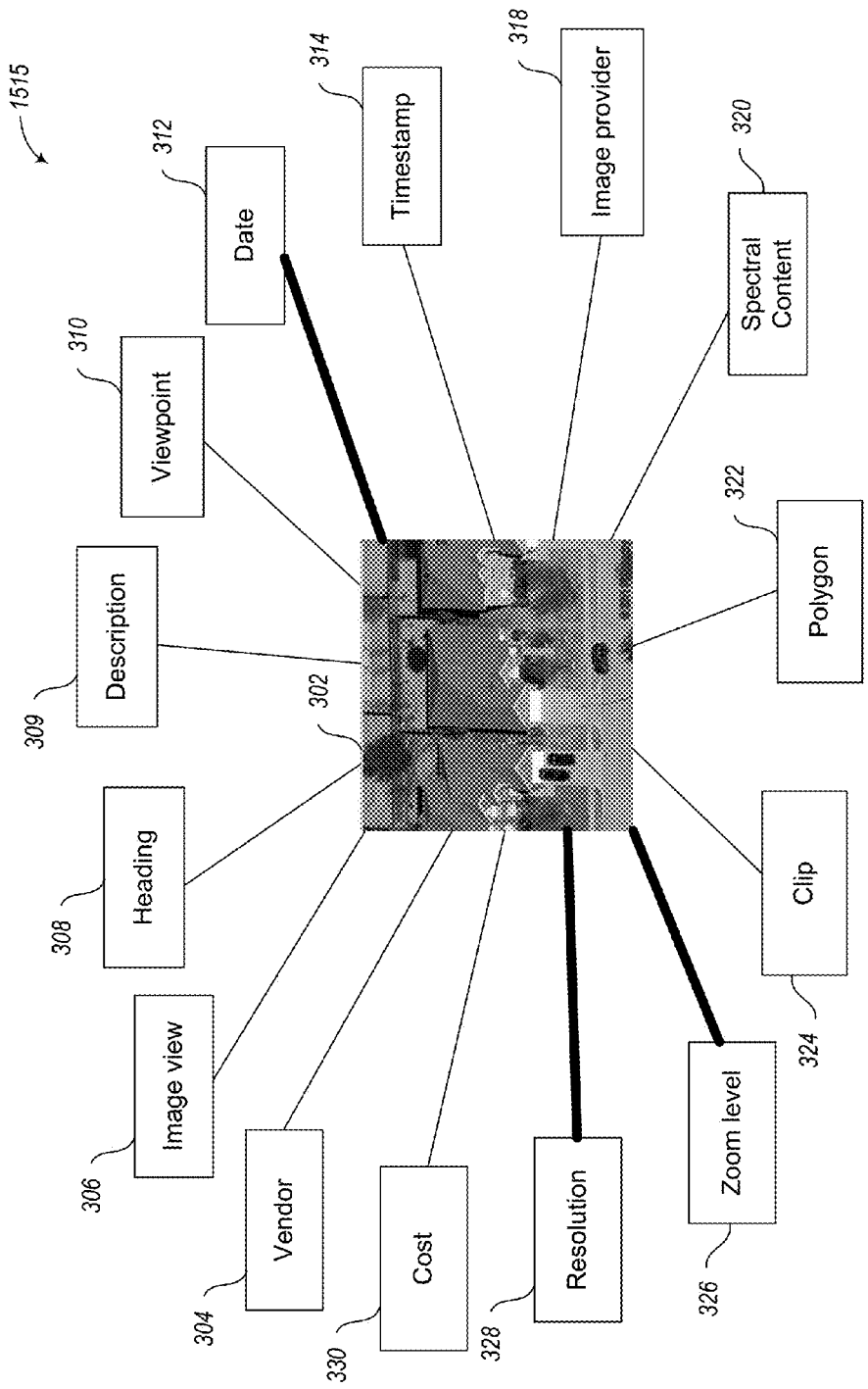

FIG. 2B is a diagram illustrating an example 1515 of an image selection implementation where the values of certain metadata attributes are considered to be more important in the selection of a relevant image, according to one non-limiting illustrated embodiment. This example shows metadata attributes that are more important for an underwriter evaluating a property to determine the type of insurance to offer and at what price to offer it. The values for these metadata attributes would be reflected in the image preference criteria for that particular underwriter. For example, the underwriter may be most interested in the date 312 for recent images that have a high zoom level 326 to show close up images of the property with a high resolution 328 to get a high level of detail to look for problems such as cupped shingles, cracked chimneys, or peeling paint on siding.

For this underwriter, the main goal is to obtain the most recent images that have a resolution level above a selected value, for example, one pixel equals six inches. In some images, one pixel is twelve or more inches while in others it might be three or four inches. For this customer, any photograph with a resolution that is six inches or higher will be selected from this group, and then the image with the most recent date is selected. After this, zoom level will be considered. These three criteria will be reviewed for each image and a weighting done of these three factors within the available images. If a plurality of images meets this criteria, then other criteria can be considered such as cost, heading, timestamp, etc. In summary, in this example, three factors in the metadata are selected for examination as part of the image selection and the others are not considered in the first review. If a proper number of figures are obtained, then none of the other criteria are even considered. On the other hand, if too many images are obtained, they can all be presented to the user or, alternatively, other criteria considered.

Figure 2C:
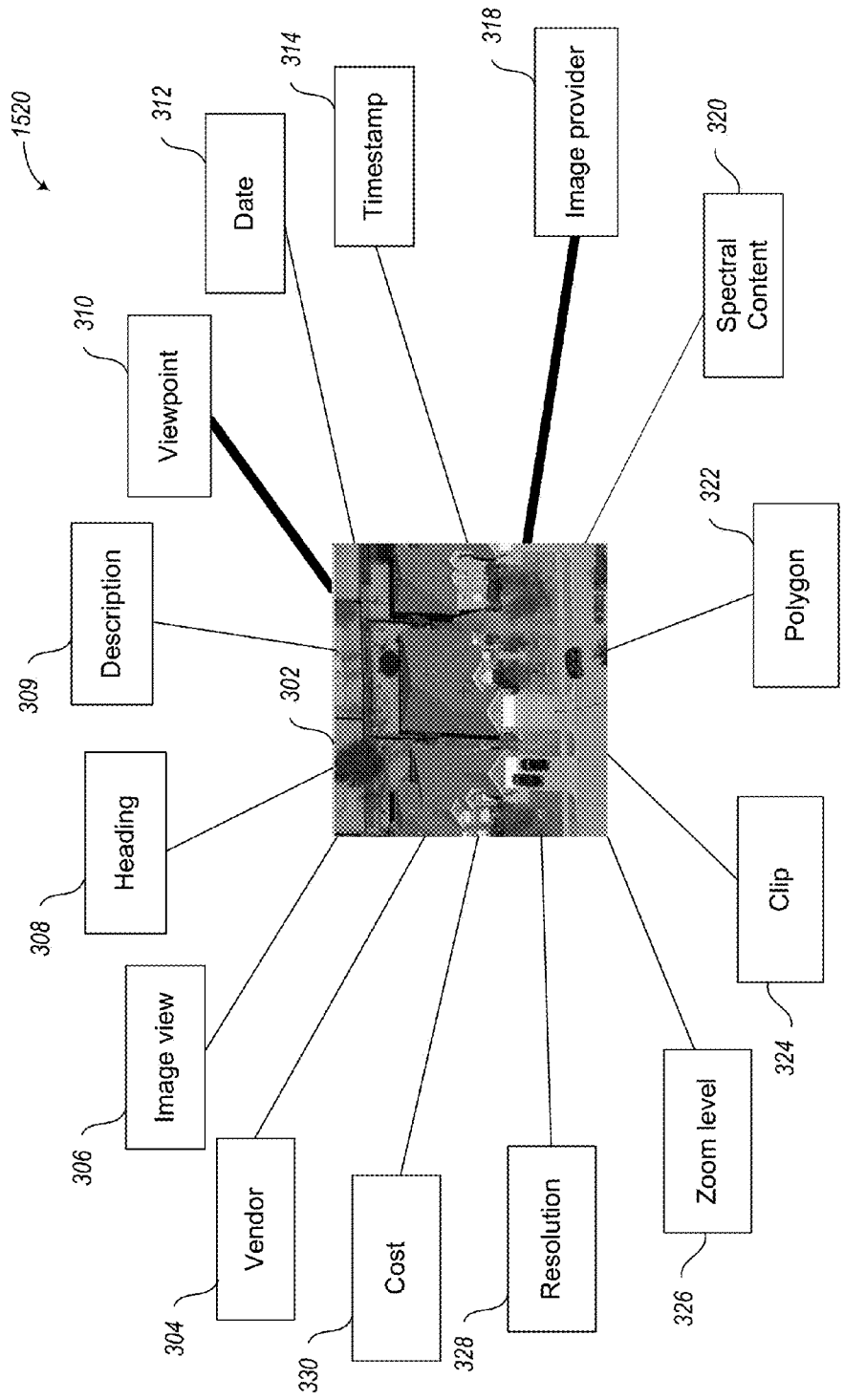

FIG. 2C is a diagram illustrating an example 1520 of another image selection implementation where the values of certain metadata attributes are considered to be more important in the selection of a relevant image, according to one non-limiting illustrated embodiment. This example shows metadata attributes that are more heavily weighted for images used by a technician who is creating a three-dimensional model of a building. The values for these metadata attributes would be reflected in the image preference criteria for the company performing the modeling. In this example, the technician may be most interested in the multiple viewpoints 310 that will show all features of the building, and the image provider 318 if the technician prefers using images coming from a particular vendor due to different vendors having different image attributes, such as "stitching" pictures together versus creating mosaics out of multiple pictures that may contain dimensional distortions and not be suitable for measurements.

For example, a preference may be given to an image that is a different heading from other images and the image database will be searched to obtain at least three different images from different headings, with a preference for five different images from different headings, at least one of which must be an orthographic view. If multiple images for the selected vendor meet this criteria, then other factors can be considered in the final selection, such as cost, date, resolution and the like.

FIG. 3 shows diagram 1502 as a non-limiting example of applying image preference criteria to determine a set of images to retrieve using a sort and a threshold. Table 1302 shows example image attribute data doing a sort for a set of images, including an image number 1304, image capture date 1306, heading 1308, which is the direction from which the image was taken, and resolution 1310 which is typically represented as inches per pixel. The images are thus sorted by their criteria. Table 1312 shows a threshold test as a simple example of image preference criteria 1314 and the corresponding resulting matches 1316 of applying the image preference criteria to the data in table 1302. For example, at 1314a the image preference criteria calls for all images with a resolution of 3 or greater to be selected, which results in the selection at 1316a of images 2, 4, 8, 9, 11 and 13. These images are then returned as a set to the requester. The images that meet a certain threshold for selected criteria are thus placed in groups. In this way, the various constraints described in the image preference criteria are applied to determine the final set of images to be selected. Other example image preference criteria are shown in 1314b through 1314e.

As noted before, the sort of table 1302 can be combined with the threshold table 1312 to achieve a threshold sort of the images.

FIG. 4A shows diagram 1503 containing a non-limiting example of using image preference criteria to calculate a total score for each image within a set of images by determining a numeric value for at least two metadata attributes and applying weighting factors to those numeric values and combining them to achieve a total score for the image.

Table 1320 lists image attributes of capture date, resolution, heading, cost and vendor. Row 1322 describes the "capture date" attribute 1322a of Example 1. The "capture date" attribute value of 0.4 1322b represents the "age" 1322c of the image. The "image preference criteria" 1322a, which in this example gives a range of values with numerical values associated with each range, applied to the attribute value is based on a point system from 0 to 100 in this embodiment. It should be appreciated that other image preference criteria may have different formula for determining the attribute score. The resulting score of 100 shown in box 1322e was determined by comparing the attribute value to the image preference criteria. This process continues for each image attribute having image preference criteria. Finally, the total score of 335 shown in box 1332 is calculated to determine a total numerical score assigned to this image. In this example, the individual scores were added together to do determine the total score. However, in other embodiments other calculations, including complex formulas and weighting factors applied to scores, may be used to calculate total score 1332.

FIG. 4B shows diagram 1503a containing another non-limiting example of using image preference criteria to calculate a total score for each image within a set of images by determining a numeric value for metadata attributes to obtain a total score for the image.

Table 1334 shows individual scores for an different image than FIG. 4A, where the "capture date" score of 50 shown in box 1336e is half that of the previous image's score of 100 shown in box 1322e, the "resolution" at 100 shown in box 1338e is better than the previous image's "resolution" of 75 as shown in box 1324e, and the "cost" of the second image at 100 at 1342e is better than the first image's "cost" at 80 at 1328e. Even with these substantial differences, the total score of the second image 1346 is only 5 points less than the total score the first image 1332. In this example, the first image, having the higher total score, would be placed ahead of the second image in the set of images returned.

Although the non-limiting image scoring embodiments shown in FIGS. 4A and 4B appear to be different than the threshold sort embodiment described in FIG. 3, there is a relationship between image scoring and threshold sort embodiments. In one example, each of the elements in the threshold sort can be represented by a total score given to each image. This can be done, for example, by building a score made up of binary digits, or "bits," that represent a score given the image's placement in a threshold sort. In building the score, the first and most important conditional in the threshold sort would be in the far left sequence of bits. For example, if all image resolutions can be identified by 4 bits, and all image costs represented by 5 bits, then using the threshold sorting technique of first sorting by image resolution and then by image cost could be represented in an image score technique by giving each image a total score (FIG. 4A 1332) consisting of 9 bits, where the left 4 bits describe image resolution and the right 5 bits represent image cost. The resulting 9-bit number associated with each image may then be sorted, thereby sorting the images in preference order. Sorting by image score will yield a similar result to applying a threshold sort.

Figure 5A:
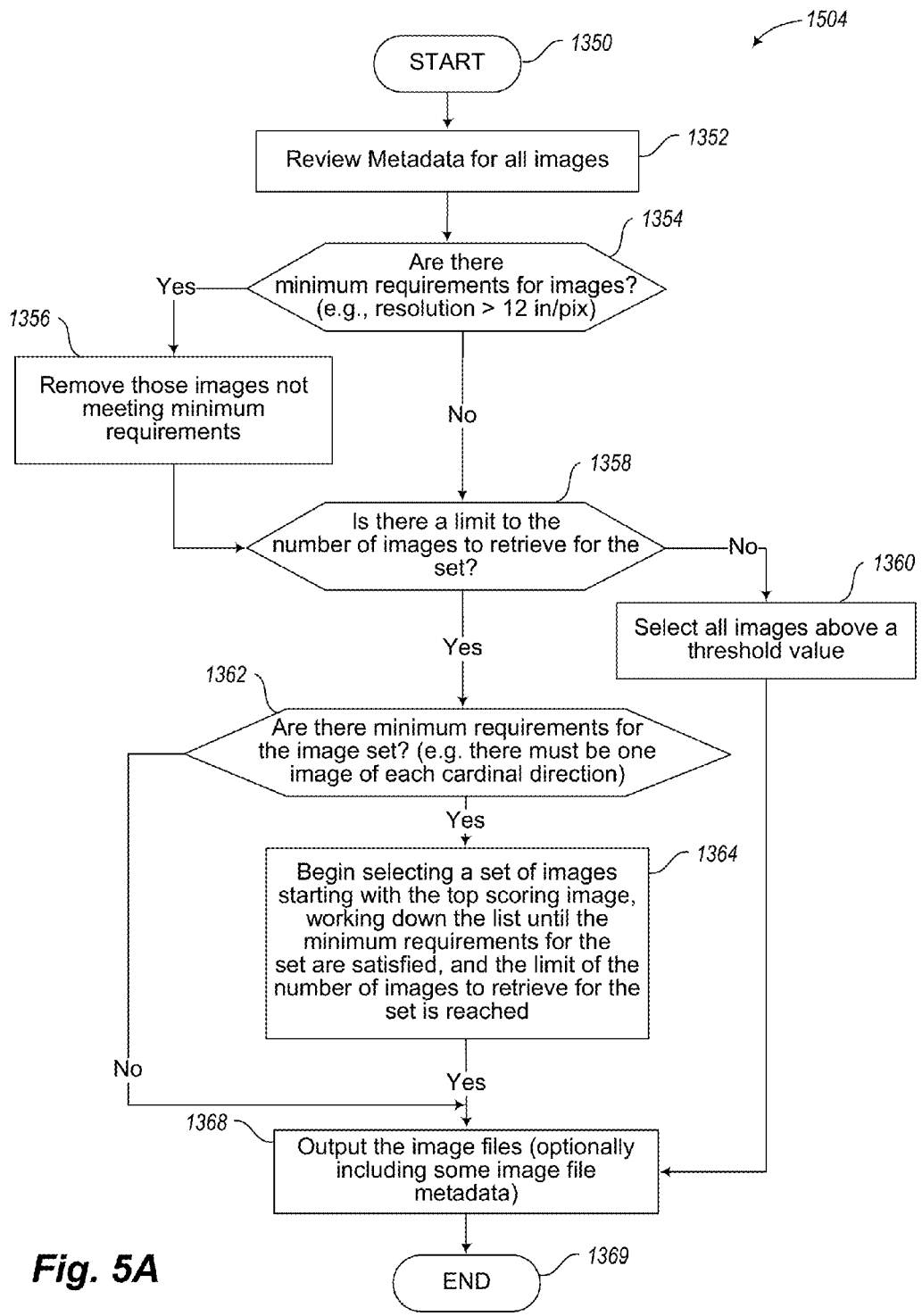
FIGS. 5A through 5D are diagrams illustrating several non-limiting example embodiments of methods of using image preference criteria in combinations of a threshold, a sort, a threshold sort and image scoring.

FIGS. 5A-5D show non-limiting examples of processes that use various combinations of a sort and a threshold as shown in FIG. 3 and image scoring as shown in FIG. 4. FIG. 5A contains a flow diagram 1504 that first calculates scores and then applies a threshold. The process begins at 1350. At 1352, metadata for all images is reviewed. At 1354, the process scans the image metadata to determine whether some images do not meet minimum requirements, for example, having a resolution greater than 12 inches per pixel. If there are images not meeting these minimum requirements, then at 1356 they are removed. At 1358, the process determines whether there is a limit to the number of images to retrieve. If there is no limit, then at 1360 all images above a threshold value are selected and the process ends. Otherwise, at 1362 the process determines whether there are minimum requirements for the image set, for example, if there must be one orthogonal image and at least one image with the heading of each of the cardinal directions. If there are minimum requirements, then at 1364 begin selecting a set of images starting with the top scoring image, working down the list, until the minimum requirements for the image set are satisfied, and the limit of the number of images to retrieve for the set is reached. Then, at 1368 output the image files, including one or more item of image file metadata, and end 1369.

Figure 5B:
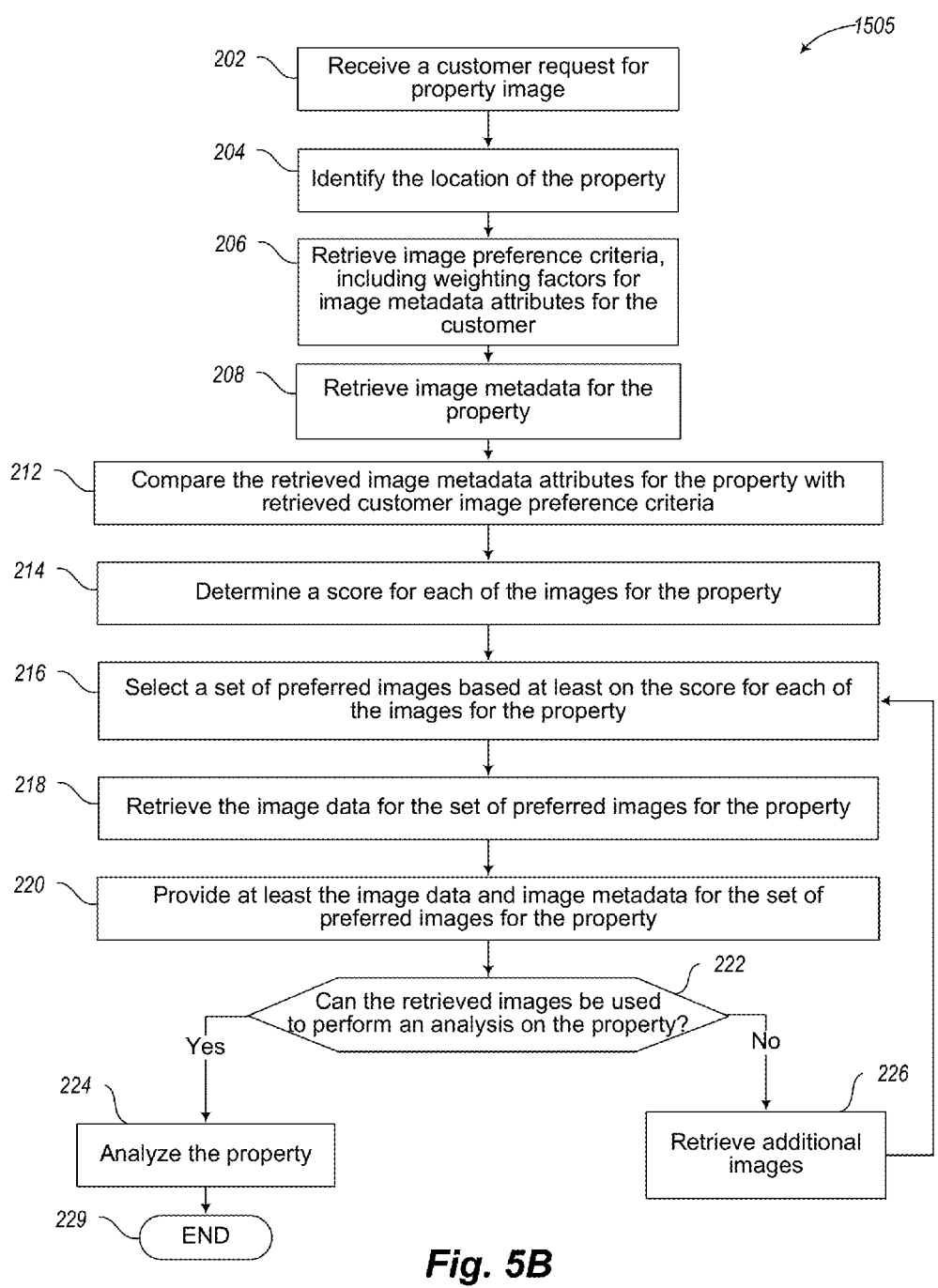

FIG. 5B is a flow diagram 1505 of an example process for identifying and retrieving preferred images to perform a property analysis using the image scoring process.

At 202, a customer request for property image is received. In this example, the request includes at least the customer name and a property address. At 204, the location of the property is identified, for example, by verifying the street address received in the previous step, by converting a geocoded location to a street address or by converting a street address to a geocoded location or a parcel number on county government records.

At 206, the image retrieval module 104 will retrieve the image preference criteria for the customer from the image preference criteria database 110. In one embodiment, if there is only one image preference criteria for a particular customer, then the customer name is provided; in other embodiments there may be multiple image preference criteria for a customer given different customer applications, in which case the customer name and application identifier are provided.

The image preference criteria may be represented by a series of values. In one example each value may be assigned a "weight" to be given to a respective metadata attribute. For an insurance company there may be different image preference criteria for viewing a property when underwriting an insurance policy, compared to viewing a property to create a claims adjustment estimate for repairing a roof. A tax assessor is a different application that may have different weight for the criteria. As discussed above, the image preference criteria may include one or more image metadata attribute threshold values or functions used to determine the preference of a particular image or set of images.

At 208, the image retrieval module retrieves, from various image sources 112, metadata attributes for images associated with the property. In some embodiments, the image preference criteria from step 206 may specify image sources to use or exclude. For some image sources, retrieving only metadata is less expensive and quicker than retrieving both the full image and metadata. In some embodiments, where the cost of downloading image data and metadata is the same, step 208 may download both image data and metadata.

At 212, the retrieved image metadata attributes are compared with the retrieved image preference criteria from step 206. In some embodiments, the comparison may take the form of examining specific metadata attributes for threshold values, such as the date of the image within one year of the current date or the resolution of the image greater than six inches per pixel. In other embodiments, the comparison may take the form of a more complex function over several images retrieved as a set. An example of one function is to take the most recent date for the image combined with the compass heading from which the image was taken, such that at least five images are identified, one as a substantially top-down (orthogonal) image and four oblique images of the property, with the orientation of each oblique image being at least 60° different from the other images.

At 214, a score is determined for each of the images or set of images on which image preference is determined. In one embodiment, a score may be a simple numerical value that results from applying weighting factors in the image preference criteria to the metadata attributes for a particular image or image set. In other embodiments, a score may consist of multiple values that identify the closeness of fit of a particular image to a set of images, or the closest fit of a set of images to the image preference criteria. In one embodiment, the weighting factors are on or off, not a sliding scale; for example, all images that meet a selected criteria or threshold are provided; those which do not meet this criteria are not selected. Thus, the weighting can be in the form of meeting a threshold. All images that meet the criteria are provided. Namely images that meet a certain criteria and are rated as a one, and those that do not meet this criteria are ranked as zero, or not acceptable.

At 216, a set of preferred images is selected based at least on the determined score for each of the images of the property. At 218, the image data for the set of preferred images for the property is retrieved. In some embodiments, the image data may have already been retrieved at step 208. At 220, at least the image data and image metadata for the set of retrieved images of the property is provided to the application. In one or more embodiments, the image data may be provided in a standard form such as a TIFF, JPEG, or PDF, and the metadata attributes provided in an XML format; however, other data formats may be used for image data and metadata.

At 222, in one or more embodiments the images are reviewed for their suitability for use in performing an analysis on the property. This review may take the form of a technician, tax assessor, customer or the like looking at the image or set of images to determine whether the offered image is usable, for example, whether the image or set of images shows enough of the major features of the building on the property, such as roof lines, dormers, and eaves. If the image shows a sufficient number of features in sufficient detail, or if the selected group of images together show a sufficient number of features in sufficient detail, the technician may proceed to analyze the property with the images 224, and the process ends at 229.

If the images together do not show sufficient number of features in sufficient detail, then new images need to be retrieved 226. In one embodiment, the image preference criteria may have specified only a certain number of images to be delivered in 220, therefore there may be additional retrieved images meeting the image preference criteria that may be immediately provided to the technician for review. If there are no additional images meeting the image preference criteria, the criteria may be altered, for example, weighting factors adjusted, and a new set of preferred images retrieved at 216 and presented. This presentation may be in the form of image metadata attributes displayed to the technician for optional image download, or in the form of both image data and image metadata attributes if the image has been already retrieved. Examples of an embodiment of this process are shown in FIGS. 6-11.

In some embodiments, the review of images for usability may be done by computer-based methods using pattern recognition and/or visual recognition techniques to identify, for example, whether expected elements such as an eave line on a roof of a building appears without obstruction within an image.

Figure 5C:
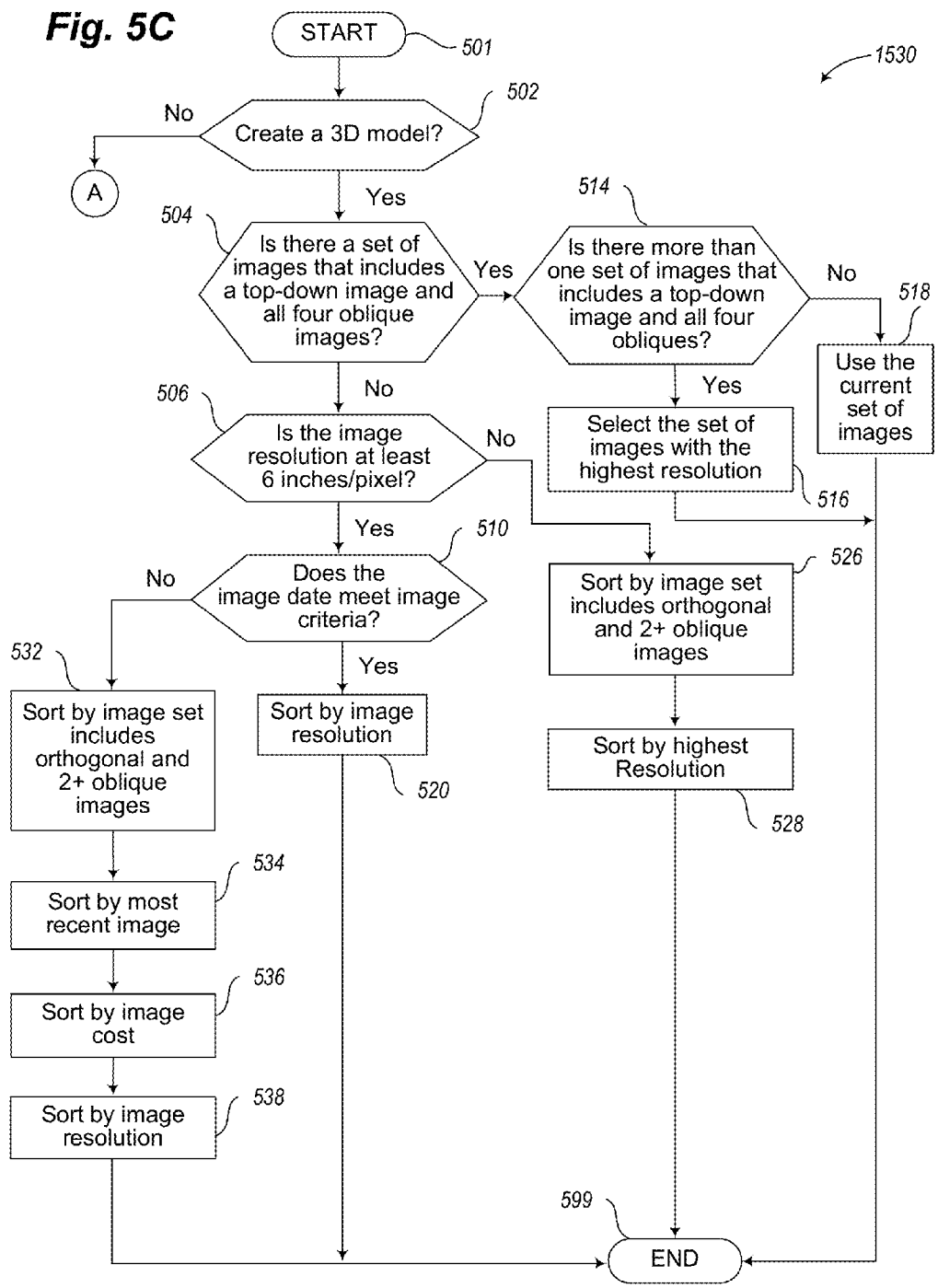

FIG. 5C is a diagram 1530 illustrating an example threshold sort process in the form of an algorithm using image metadata attributes to determine a preferred ranking for images associated with creating two- and three-dimensional models of a building, according to one non-limiting embodiment. This technique combines the steps of a sort with the steps of the threshold to perform a threshold sort. This algorithm evaluates the metadata of the retrieved images to determine the relevant images or set of images to be used, and the order in which they are to be used.

The process begins at "Start" 501. At 502 the process determines if the images are to be used to create a three-dimensional model. Three-dimensional models require more than one image, preferably a top-down (orthogonal) image and four oblique images each from different headings. If a two-dimensional model is to be created, the flow moves to connector "A" on FIG. 5D. otherwise, at 504 the process checks to see if there is a set of images that includes a top-down image and all four oblique images. If so, at 514 the process determines if there is more than one set of images that includes a top-down image in all four obliques. If so, at 516 the set of images with the highest resolution is selected, and the process ends. If not, at 518 the current set of images is used, and the process ends.

If at 504 there are no images that include a top-down image and all four oblique images, then at 506 the process determines whether the image in question has resolution of at least 6 inches per pixel. If it does, then at 510 the process determines whether the image date meets the image preference criteria. If it does, at 520 the process sorts the images by resolution and ends. If not, at 532 the image sets are sorted by orthogonal and at least two oblique images if they were available. At 534 the images are sorted by most recent image, at 536 the images are sorted by image cost, and finally at 538 the images are sorted by image resolution, and the process ends.

If at 506 the image resolution is less than 6 inches per pixel, then at 526 the image set is sorted by sets that include an orthogonal and at least two oblique images, then at 528 the images are sorted by highest resolution, and the process ends. At the process and 599, the image set is presented to the customer.

Figure 5D:
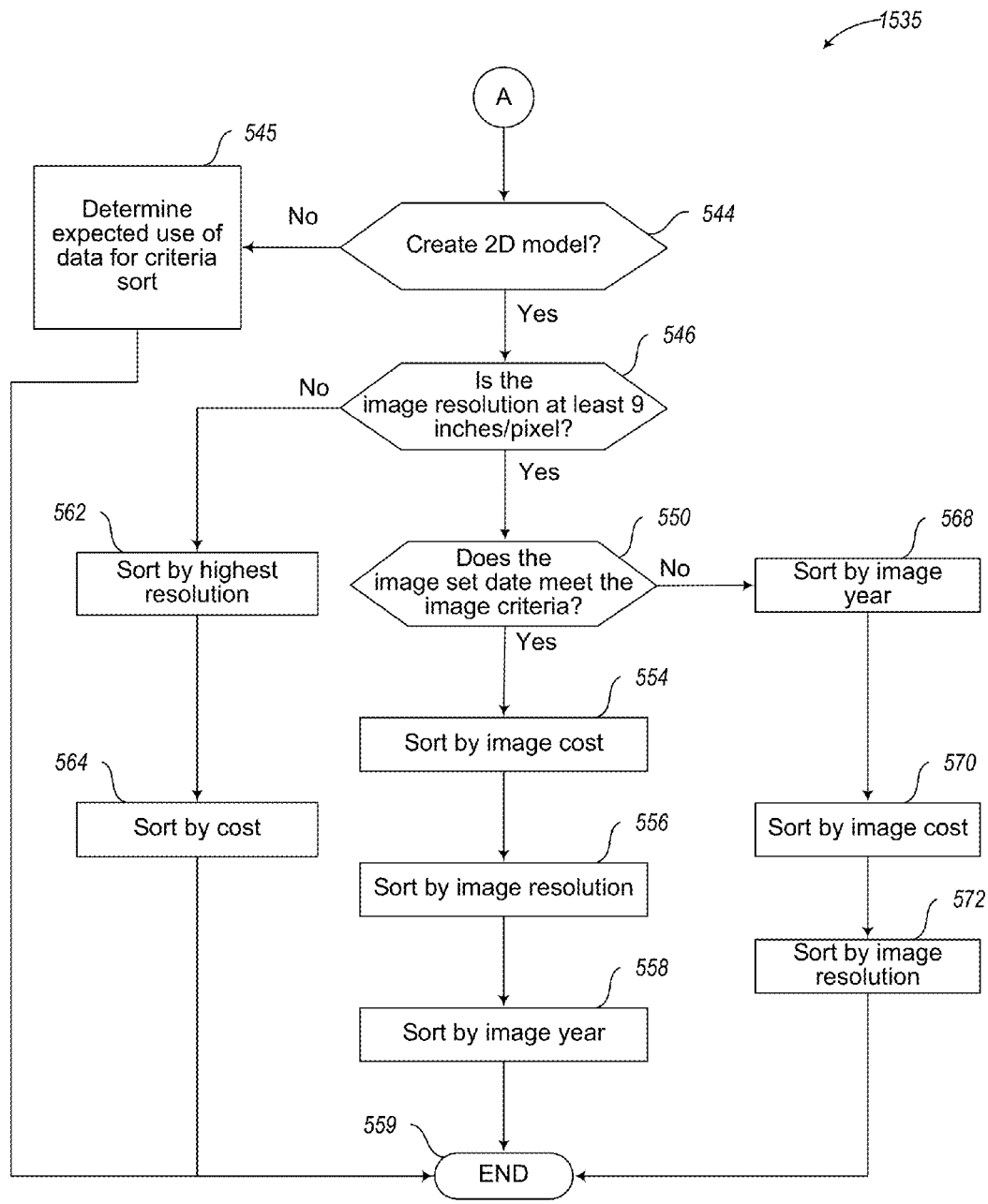

FIG. 5D is a diagram 1535 illustrating an example threshold sort process in the form of an algorithm using image metadata attributes to determine a preferred ranking for images associated with creating two-dimensional models of a building, according to one non-limiting illustrated embodiment. At 544, the first step is to determine if the images are to be used to create a two-dimensional model. If not, then at 545 the user is asked for the expected use of the data, which will determine a criteria sort to be used, and the process ends 559. If a two-dimensional model is to be created, then at 546, the image metadata attribute "resolution" is checked for a resolution of at least 9 inches per pixel. If the resolution is at least 9 inches per pixel, then at 550 the metadata attribute "date" is checked to see if it meets the image preference criteria. If it does, then at 554 the image is sorted by metadata attribute "cost," at 556 sorted by metadata attribute "resolution," and then at 558 sorted by metadata attribute "year," the image set is presented to the customer, and the process ends 559. If the "date" does not meet the image preference criteria, then at 568 the images sorted by year, at 570 the images are sorted by image cost, and at 572 the images are sorted by image resolution, and the set is presented to the customer. If the image "resolution" is not at least 9 inches per pixel, then at 562 the images are sorted by highest resolution, and then at 564 the images are sorted by cost, and the image set is presented to the customer, and the process ends 559.

In each path, the resulting images are presented to the application in the order determined by the image preference criteria.

Figure 6:
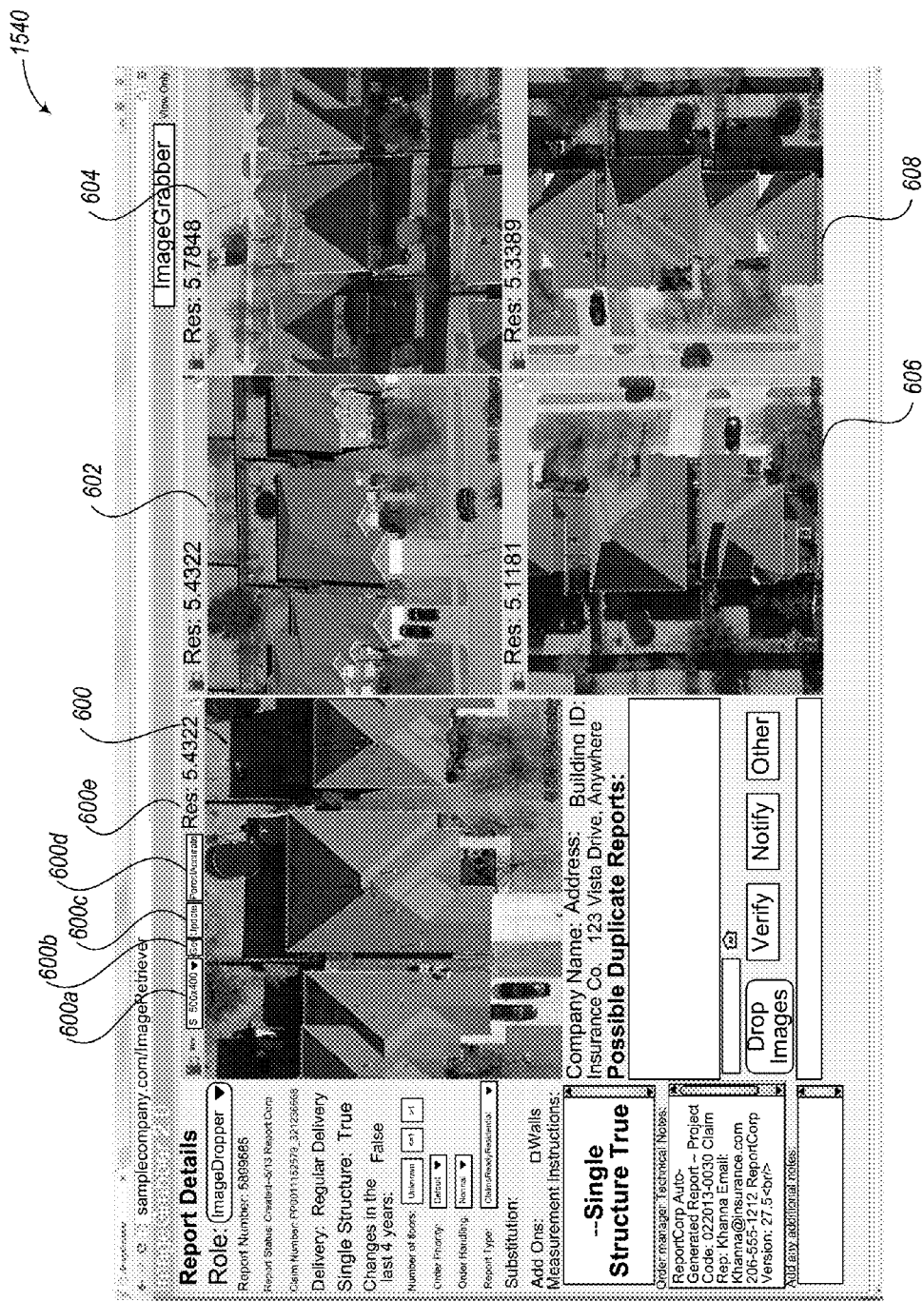
FIG. 6 is a screenshot illustrating example software that uses preferred images to analyze a property, according to one non-limiting embodiment.

FIG. 6 shows screen 1540 which is an example embodiment of an application that receives one or more relevant images and displays the images via the application for use by a technician to create a report. In this example, five images are displayed for the technician to use. A first main image 600 is a substantially top-down orthogonal view of the building on the property. Images 602, 604, 606, and 608 represent different images of the same building on the same property, but each taken at a different oblique angle roughly corresponding to north, south, east, and west, the four main compass bearings. The report details include a report number, report status, claim number, delivery process, order priority, order handling, and report type. Information about the structure of the building on the property is also included as the report is being generated, such as whether it is a single structure, if there have been changes in the last four years, and number of floors of the building.

When an image is selected, metadata information about the image, as well as functions used to manipulate the image, are displayed. Area 600a shows the pixel dimension of the image, and selecting the down-arrow provides other pixel dimensions the image may be viewed in (not shown). Area 600b is a button that when selected retrieves the preferred set of images to display in the image display areas 600, 602, 604, 606, and 608. Button 600c, when selected, allows a user to view and select the next preferred image for any particular image display area, and is explained further below. Display 600d displays "parcel accurate" when the system has determined that the address for the building in question has been matched to a known geolocation of a land parcel or building relevant to the retrieved image set. Finally, the resolution of the image is shown in area 600e.

Figure 7:
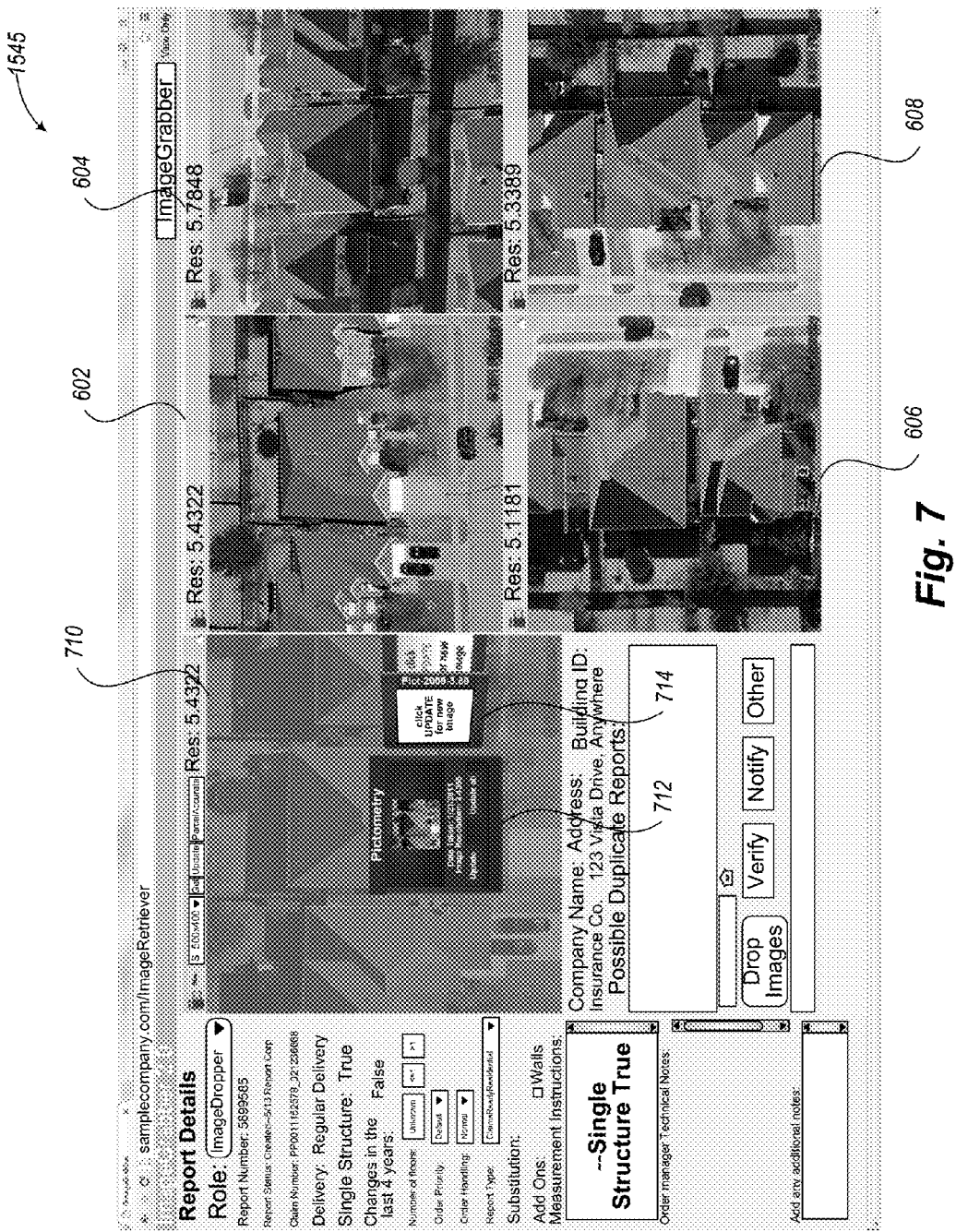
FIG. 7 is a screenshot illustrating example software that allows an operator to replace a top-down image with another preferred image, according to one non-limiting embodiment.

FIG. 7 shows screen 1545 which is displayed in the example embodiment when the user selects the "update" button 600c. For example, if an image had a higher score than other images, yet had a large maple tree blocking a view of a building, that image may be rejected and another image with a lower score selected that was taken from a similar orientation but at a time when there were no leaves on the tree, providing a clear view of the building. A small window 712 is displayed which allows the user to replace the current image by retrieving the next preferred image based on the image preference criteria. In this example there are additional images available, which is indicated by a rotated small image 714 representing that an additional unused image is available.

Figure 8:
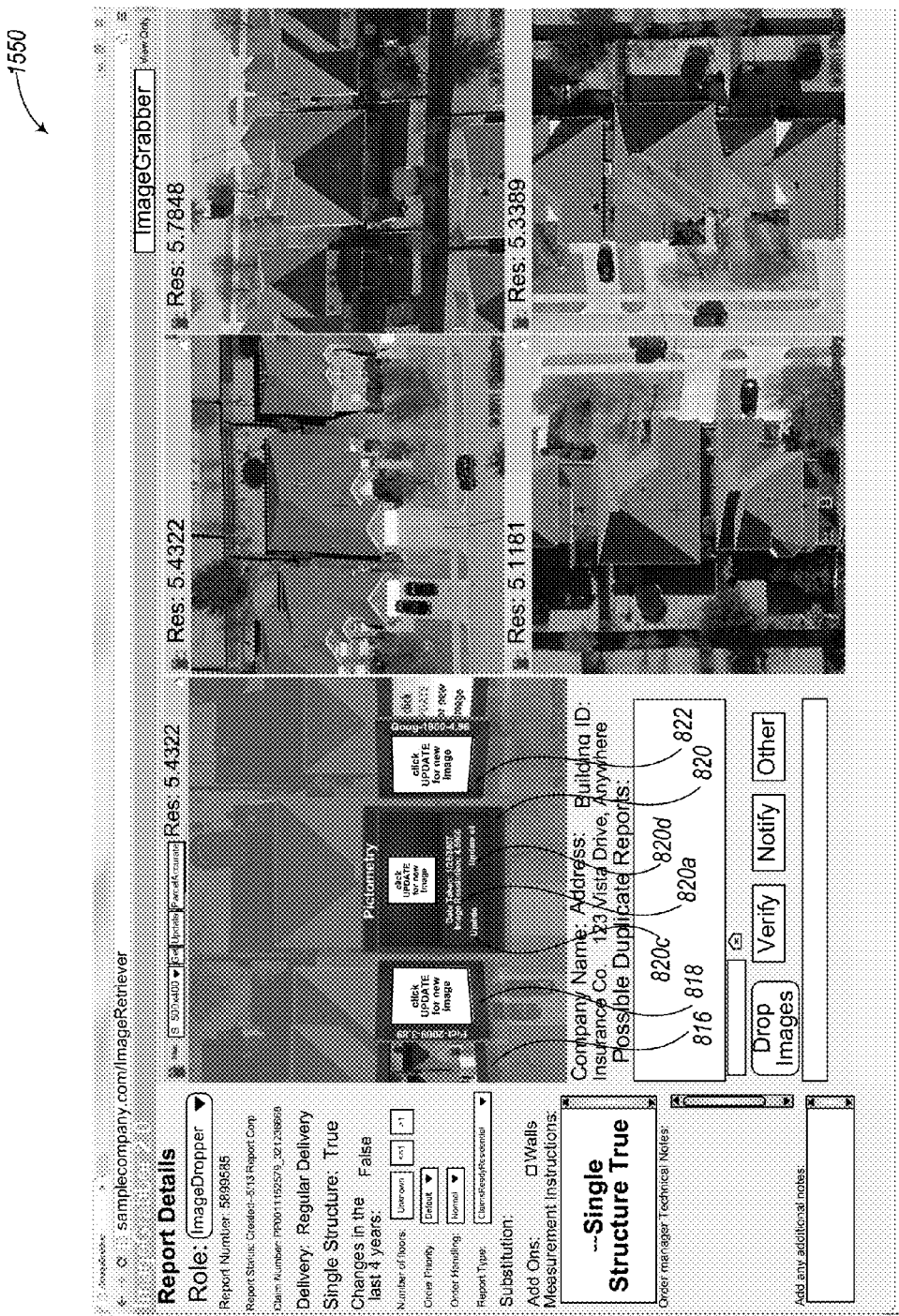
FIG. 8 is a screenshot illustrating example software that allows an operator to scroll through a set of image placeholders to replace a top-down image with another preferred image, according to one non-limiting embodiment.

FIG. 8 shows screen 1550 which is displayed in the example embodiment when the user scrolls through the selected small windows, shown in 816, 818, 820, and 822. In small window 820, metadata information for the suggested photograph is presented for the user to decide if the image should be updated. In this example, the user is presented with the source of the image, date the image was taken and the image resolution 820a as the metadata. The user is then given the choice to either update this particular image 820c, which will replace the image at 710 with the image shown in the thumbnail 820, or to update all images 820d which, in this example, will update all five images by putting new images in place of the current images as the preferred image set associated with the now current image 820.

Figure 9:
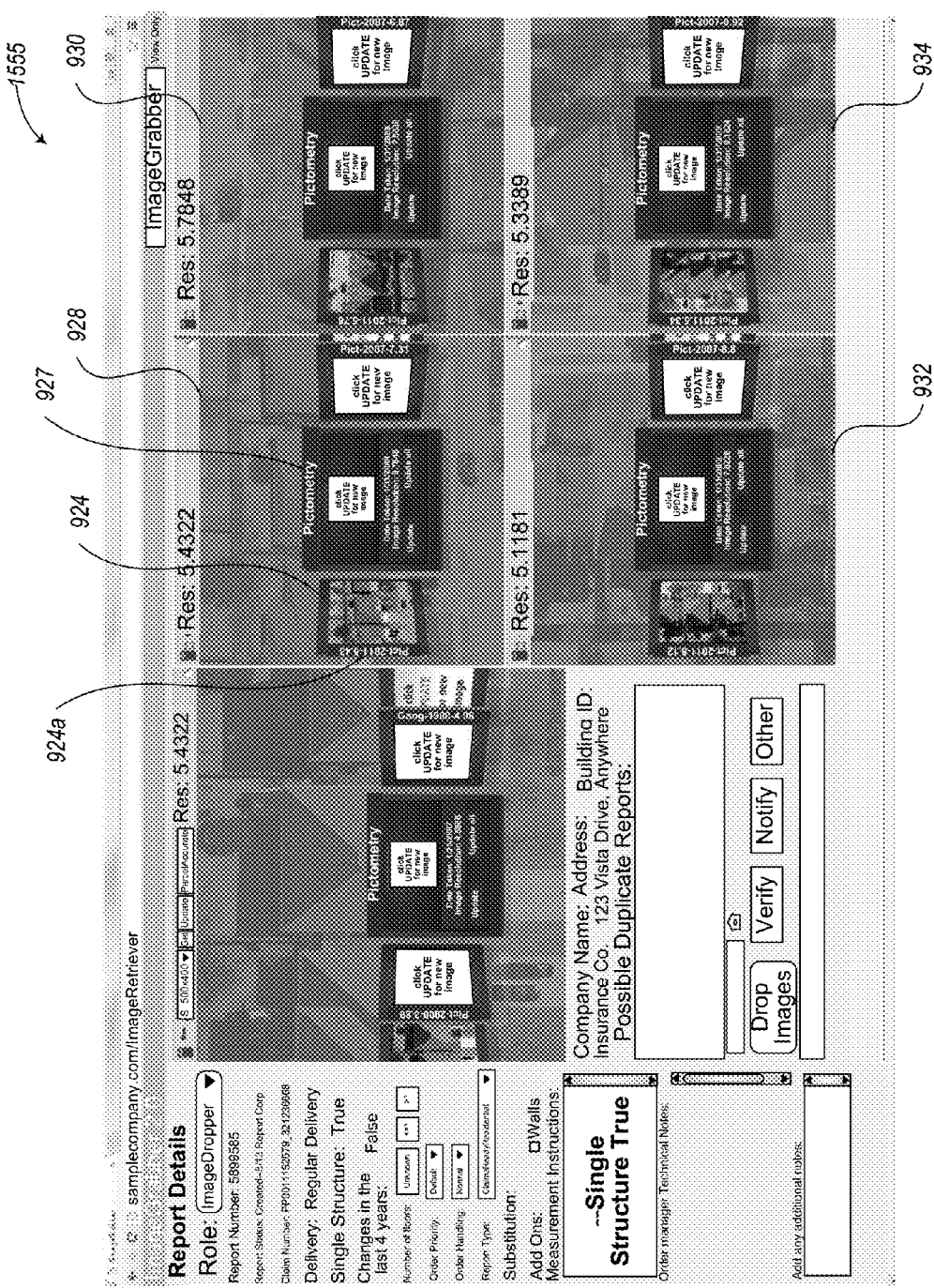
FIG. 9 is a screenshot illustrating example software that allows an operator to scroll through a set of image placeholders to replace multiple images with other preferred images, according to one non-limiting embodiment.

FIG. 9 shows screen 1555 which is displayed in an alternative example embodiment when the user selects the "update" button 820c. Here, the user is given the option to independently update each image using the update button 927: the main image 926, as well as oblique images 928, 930, 932, and 934. If the image has already been retrieved at 924, a thumbnail of that image is shown in the small window, along with metadata information such as the image source and date taken at 924a. The user is then able to scroll through the individual small windows and select the image best suited for the user's requirements. Upon selecting this image, the prior image is removed and this one takes its place.

Figure 10:
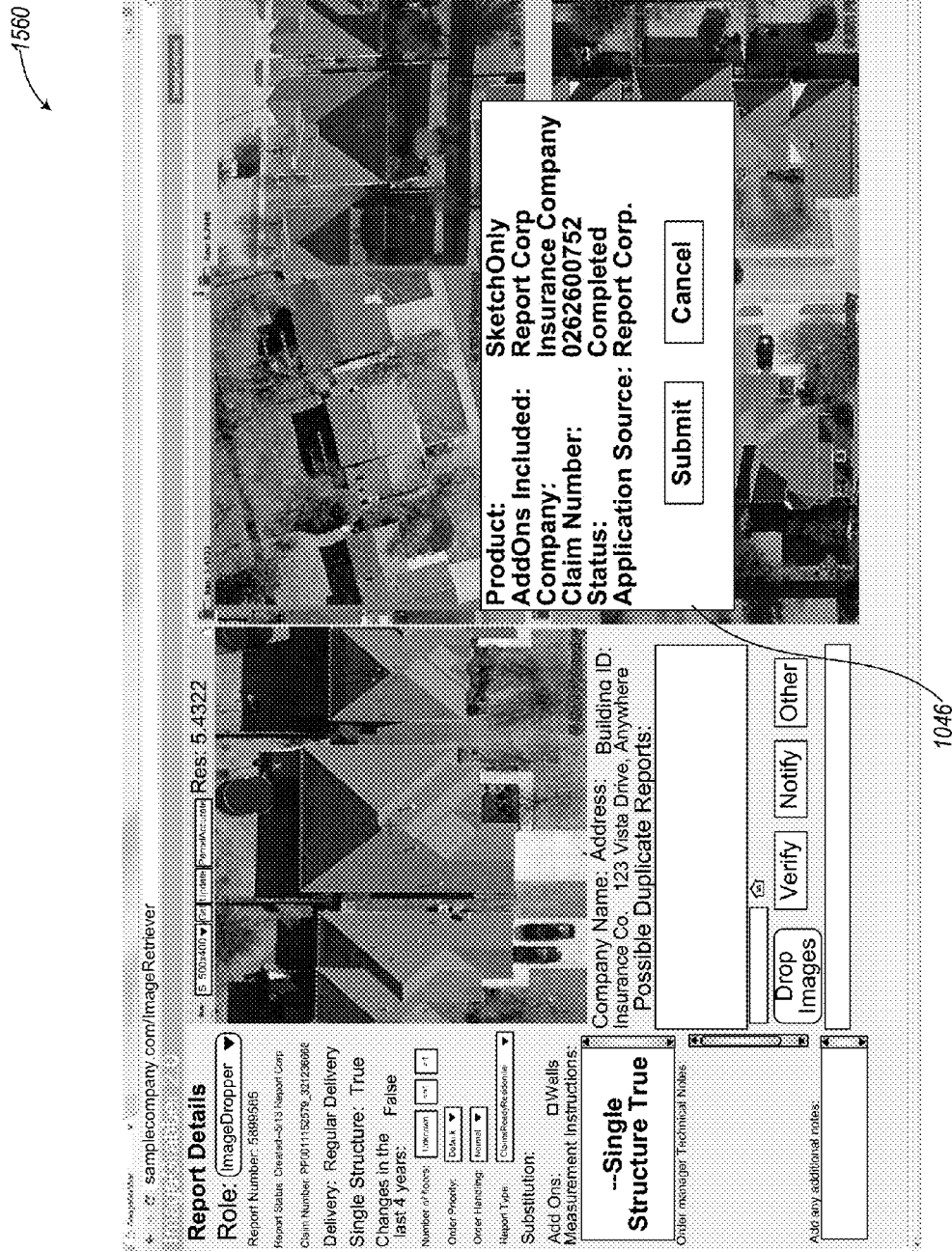
FIG. 10 is a screenshot illustrating example software that identifies characteristics of a final report to be generated based on property analysis from the selected images, according to one non-limited embodiment.

FIG. 10 shows screen 1560, which is displayed in the example embodiment when the user is satisfied with the retrieved images and wishes to generate the report. A summary of high-level report attributes is displayed at 1046, and the user is given the option to either submit or cancel the report.

Figure 11:
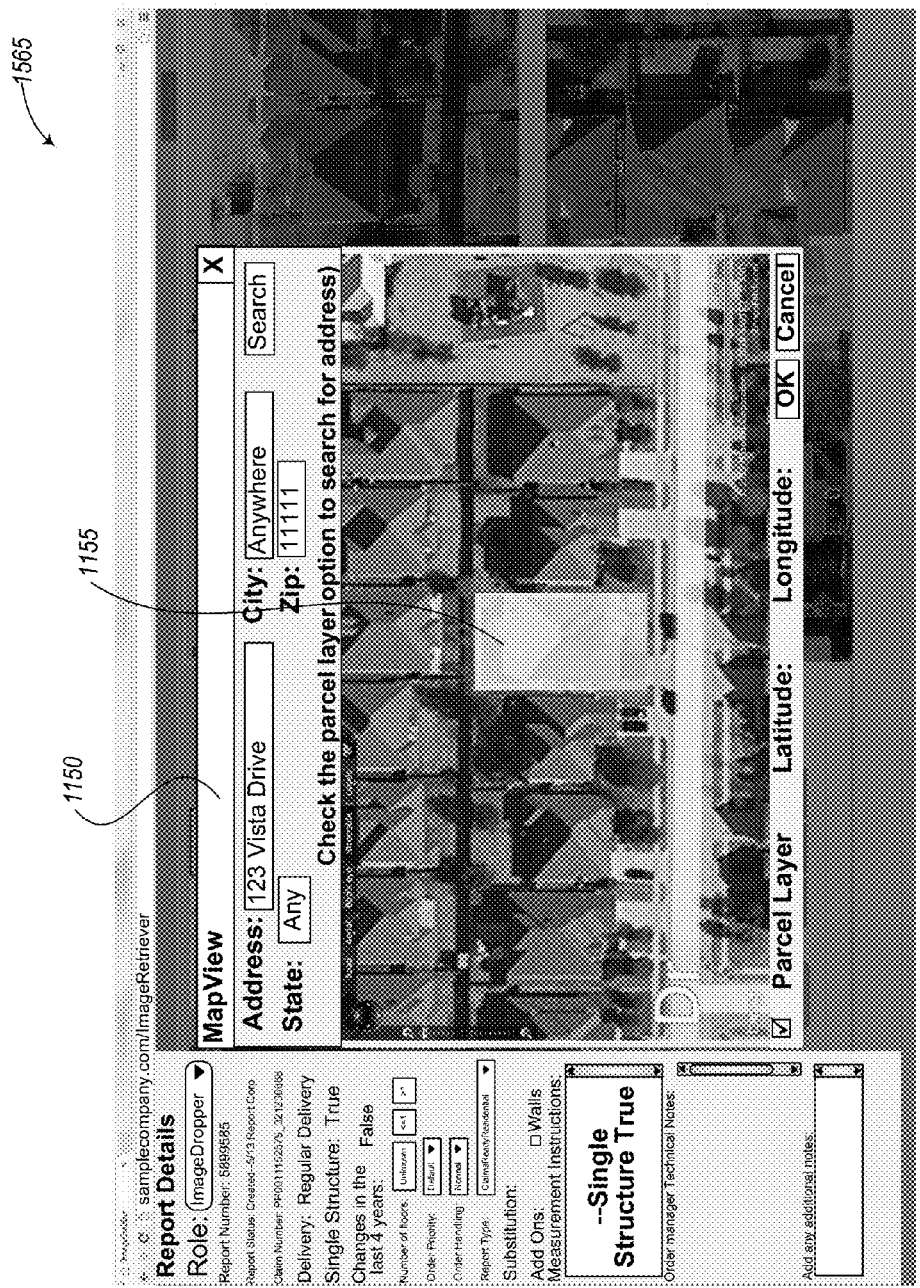
FIG. 11 is a screenshot illustrating example software that verifies a valid address for the property to be analyzed, according to one non-limiting embodiment.

FIG. 11 shows screen 1565, which is displayed in the example embodiment when the user wishes to verify that a given street address is valid. The user enters the address, city, state and ZIP Code into data fields at 1150. If the address entered matches a valid parcel, the image of the parcel is displayed and highlighted at 1155. In another embodiment, if the system is unable to match a street address, the closest valid address is displayed.

Figure 12:
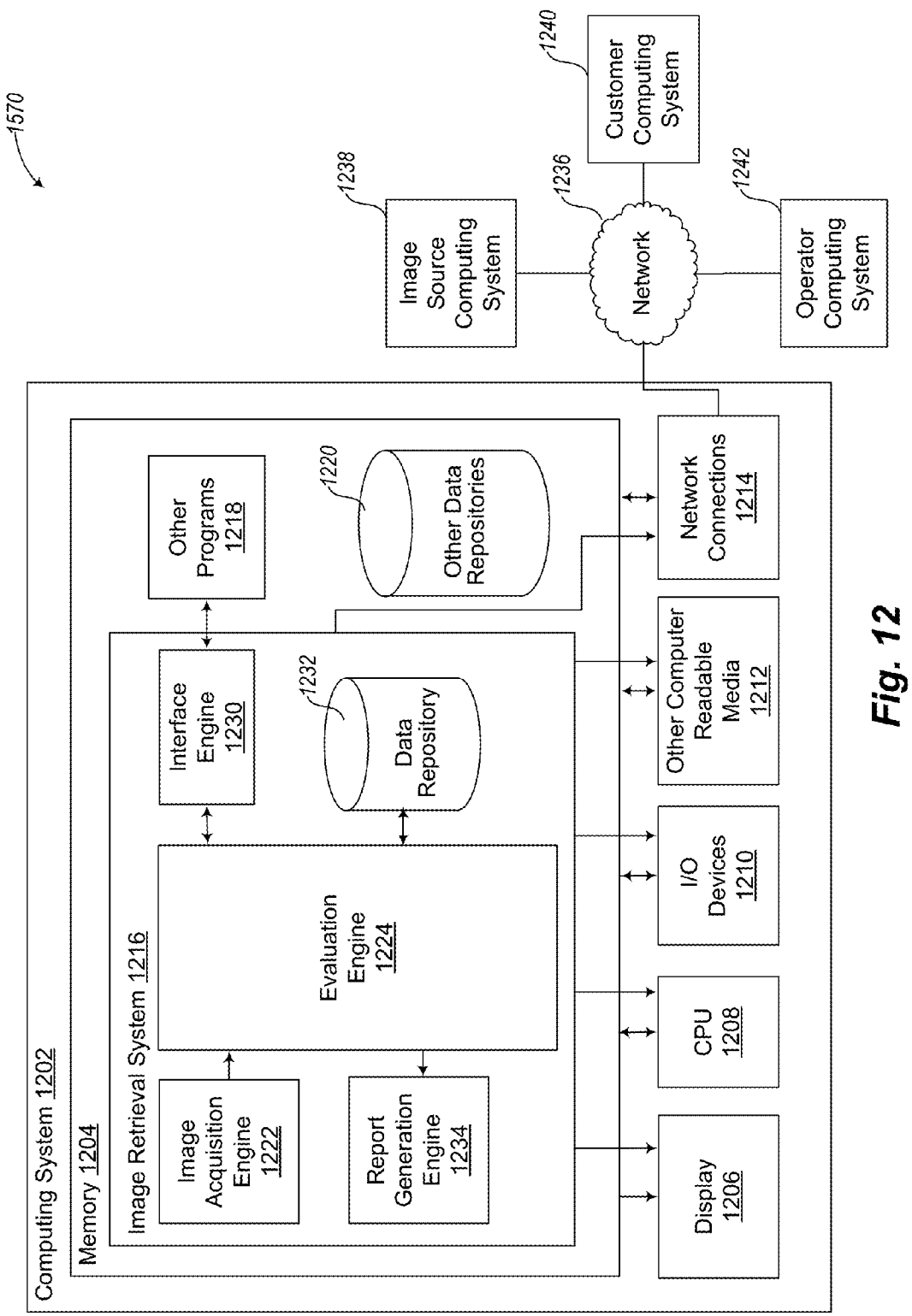
FIG. 12 is a schematic diagram of a computing environment in which systems and methods for retrieving preferred images may be implemented or of which they may be a part.

FIG. 12 shows, at 1570, an example block diagram of a computing system 1202 for practicing embodiments of the preferred image retrieval method described herein, and for practicing embodiments of a preferred image retrieval estimation system, according to one embodiment.

One or more general purpose or special purpose computing systems may be used to implement the computer- and network-based methods, techniques, and systems for preferred image retrieval computation described herein and for practicing embodiments of a preferred image retrieval system. More specifically, the computing system 1202 may comprise one or more distinct computing systems present at distributed locations. In addition, each block shown may represent one or more such blocks as appropriate to a specific embodiment or may be combined with other blocks. Moreover, in one embodiment, the various components of an image retrieval system 1216 may physically reside on one or more machines, which use standard inter-process communication mechanisms (e.g., TCP/IP) to communicate with each other. Further, a preferred image retrieval system may be implemented in software, hardware, firmware, or in some combination to achieve the capabilities described herein.

In the embodiment shown, the computing system 1202 comprises a computer memory ("memory") 1204, a display 1206, one or more Central Processing Units ("CPUs") 1208, Input/Output devices 1210 (e.g., keyboard, mouse, joystick, track pad, CRT or LCD display, and the like), other computer-readable media 1212, and network connections 1214. An image retrieval system 1216 is shown residing in the memory 1204. In other embodiments, some portion of the contents or some or all of the components of the image retrieval system 1216 may be stored on and/or transmitted over the other computer-readable media 1212. The components of the image retrieval system 1216 preferably execute on one or more CPUs 1208 and retrieve images, as described herein. Other code or programs 1218 (e.g., a Web server, a database management system, and the like) and potentially other data repositories, such as data repository 1220, also reside in the memory 1204, and preferably execute on one or more CPUs 1208. Not all of the components in FIG. 12 are required for each implementation. For example, some embodiments embedded in other software do not provide means for user input, display, a customer computing system, or other components. Currently, some inputs to the image retrieval system 1216 are automatically generated, but other inputs may be entered manually to supplement data acquired through automated means.

In a typical embodiment, the image retrieval system 1216 includes an image acquisition engine 1222; an evaluation engine 1224; a report generation engine 1234, an interface engine 1230, and a data repository 1232 which includes the image preference criteria database. Other and/or different modules may be implemented. In addition, the image retrieval system 1216 interacts via a network 1236 with an image source computing system 1238, an operator computing system 1242, and/or a customer computing system 1240. Communication system network 1236 may utilize one or more protocols to communicate via one or more physical networks, including local area networks, wireless networks, dedicated lines, intranets, the Internet, and the like.

The image acquisition engine 1222 performs at least some of the functions described herein, with respect to the processes described herein. In particular, the image acquisition engine 1222 interacts with the image source computing system 1238 to obtain one or more images and associated metadata, and stores those images in the image retrieval system data repository 1232 for processing by other components of the image retrieval system 1216.

The evaluation engine 1224 performs at least some of the functions described with reference to FIGS. 1-12.

In one embodiment, at 1240 a customer computing system uses retrieved images to generate an estimated roof area, wall area, and floor area measurement of the building based on the retrieved images. The roof measurements may be generated by the roof estimation system described in one or more of: U.S. Pat. No. 8,078,436, issued Dec. 13, 2011, entitled "AERIAL ROOF ESTIMATION SYSTEMS AND METHODS" (hereinafter, referred to as the '436 patent); U.S. Pat. No. 8,209,152, filed May 15, 2009, entitled "CONCURRENT DISPLAY SYSTEMS AND METHODS FOR AERIAL ROOF ESTIMATION" (hereinafter, referred to as the '152 patent); U.S. patent application Ser. No. 13/019,228, filed Feb. 1, 2011 and entitled "GEOMETRIC CORRECTION OF ROUGH WIREFRAME MODELS DERIVED FROM PHOTOGRAPHS" (hereinafter, referred to as the '228 application); U.S. Provisional Patent Application Ser. No. 61/594,964, filed Feb. 3, 2012 and entitled "SYSTEMS AND METHODS FOR ESTIMATION OF BUILDING FLOOR AREA" (hereinafter, referred to as the '964 application); U.S. Provisional Patent Application Ser. No. 61/594,956, filed Feb. 3, 2012 and entitled "SYSTEMS AND METHODS FOR ESTIMATION OF BUILDING WALL AREA" (hereinafter, referred to as the '956 application); U.S. patent application Ser. No. 13/757,712, filed Feb. 1, 2013 and entitled "SYSTEMS AND METHODS FOR ESTIMATION OF BUILDING FLOOR AREA" (and hereinafter, referred to as the '712 application), and U.S. patent application Ser. No. 13/757,694, filed Feb. 1, 2013 and entitled "SYSTEMS AND METHODS FOR ESTIMATION OF BUILDING WALL AREA" (and hereinafter, referred to as the '694 application), which are each incorporated herein by reference in their entireties.

Additionally, it is expressly contemplated that any operable combination of one or more of any of the features or components of the estimation systems, measurement systems and/or reports described or shown in, but not limited to: the '436 patent; the '244 application; the '152 patent; the '228 application; the '964 application; the '956 application; the '712 application, and/or the '694 application; may be integrated and/or used with, or in, any operable combination of one or more of any of the features or components of the systems described or shown herein, and are operably included in various different embodiments.

In many such embodiments, one or more of the roof measurements are based on aerial photographs of the building via manual or automated analysis of roof features, such as by using the roof estimation system and/or other modules described in one or more of: the '436 patent; the '244 application; the '152 patent; the '228 application; the '964 application; the '956 application; the '712 application, and/or the '694 application.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a computer processor;
a memory coupled to the processor;
a module stored on the memory and that is configured, when executed, to:
receive an identifier of a location of a property;
receive a plurality of image preference criteria for each of a plurality of attributes, each image preference criteria includes a weighting factor that corresponds to a potential attribute value;
identify one or more image sources, each image source containing a plurality of images of the location of the property, each corresponding image having image data and image metadata, the image metadata having an attribute value for each of the plurality of attributes for the corresponding image;

retrieve the image metadata for each of the plurality of images of the property from the one or more image sources;

for each image of the plurality of images:
  for each attribute of the plurality of attributes for an image:
    select one of the plurality of image preference criteria based on a comparison of the attribute value for an attribute and the potential attribute value for each of the plurality of image preference criteria for the attribute; and
    determine an attribute score for the attribute by selecting the weighting factor that corresponds to the selected image preference criteria; and
  calculate an image score for the image by combining the attribute score for each of the plurality of attributes for the image;
select a set of high-score images for the property based on the calculated image score for each of the plurality of images of the property;
retrieve the image data for the set of high-score images for the property; and
output the image data and at least some of the image metadata for the set of high-score images for the property to the system.

2. The system of claim 1, wherein select a set of high-score images for the property comprises:
select a set of high-score images for the property based on the calculated image score for each of the plurality of images of the property being above a threshold value.

3. The system of claim 1, wherein receive the plurality of image preference criteria comprises:
receive the plurality of image preference criteria from an image preference criteria database containing the plurality of image preference criteria.

4. The system of claim 1, wherein the plurality of image preference criteria is customized for a customer.

5. The system of claim 1, wherein the plurality of image preference criteria is customized for an expected use of the images.

6. The system of claim 1, wherein the image metadata includes at least one of the following attributes: vendor, image view, heading, description, viewpoint, date, timestamp, image provider, spectral content, polygon, clip, zoom level, resolution, and cost.

7. The system of claim 1, wherein the module stored on the memory is further configured to:
wherein retrieve the image metadata for the plurality of images of the property from the one or more image sources further comprises:
  retrieve the image data for the plurality of images of the property from the one or more image sources; and
perform computer-based visual processing analysis on the image data for the plurality of images of the property to update the image score for the plurality of images of the property.

8. A method, comprising:
receiving an identifier of a location of a property;
receiving a plurality of image preference criteria for each of a plurality of attributes, each image preference criteria includes a potential attribute value and has a corresponding weighting factor value;
identifying one or more image sources, each image source containing a plurality of images of the location of the property, each corresponding image having image data and image metadata, the image metadata having an attribute value for each of the plurality of attributes for the corresponding image;
retrieving the metadata for each of the plurality of images of the property from the one or more image sources;
calculating an image score for each corresponding image of the plurality of images of the property by combining an attribute score for each of the plurality of attributes of the corresponding image, the attribute score of each corresponding attribute is selected based on a comparison of the attribute value for the corresponding attribute with the potential attribute value for each of the plurality of image preference criteria for the corresponding attribute, the attribute score is the weighting factor value that corresponds to the potential attribute value of the image preference criteria that maps to the attribute value of the corresponding attribute;
selecting a set of high-score images for the property based on the image score for each of the plurality of images of the property;
retrieving the image data for the set of high-score images for the property; and
outputting the image data and at least some of the image metadata for the set of high-score images for the property to the system.

9. The method of claim 8, wherein the step of selecting a set of high-score images for the property based on the image score for each of the plurality of images of the property comprises:
selecting a set of high-score images for the property based the image score for each of the plurality of images of the property being above a threshold value.

10. The method of claim 8, wherein the step of receiving the plurality of image preference criteria further comprises:
receiving the plurality of image preference criteria from an image preference criteria database containing the plurality of image preference criteria.

11. The method of claim 8, wherein the metadata includes at least one of the following attributes: vendor, image view, heading, description, viewpoint, date, timestamp, image provider, spectral content, polygon, clip, zoom level, resolution, and cost.

12. The method of claim 8, further comprising:
wherein retrieving the metadata for the plurality of images of the property from the one or more image sources further comprises, retrieving image data for the plurality of images of the property from the one or more image sources; and
performing computer-based visual processing analysis on the image data for the plurality of images of the property to update the image score for the plurality of images of the property.

13. A non-transitory computer-readable storage medium storing computer executable instructions that, when executed by a computer processor, cause the following to be performed:
receiving, from each of a plurality of customers, a plurality of image preference criteria for each of a plurality of attributes, wherein each image preference criteria includes a potential attribute value that is customized for each of the plurality of customers;
receiving a request for images of a property from a customer of the plurality of customers;
identifying one or more image sources that meet selected image preference criteria for the customer, each image source containing a plurality of images of the property, each image having image data and image metadata, the image metadata having an attribute value for each of the plurality of attributes;

retrieving the metadata for the plurality of images of the property;

determining an attribute score for each corresponding attribute of the plurality of attributes for each of the plurality of images based on a comparison of the attribute value of the retrieved metadata for the corresponding attribute with the potential attribute value of each of the plurality of image preference criteria of the customer for the corresponding attribute;

combining the attribute scores to determine an image score for each of the plurality of images of the property;

selecting a set of high-score images for the property for the customer based on the image score for each of the plurality of images of the property;

retrieving the image data for the set of high-score images for the property; and outputting the image data and at least some of the image metadata for the set of high-score images for the property.

14. The non-transitory computer-readable storage medium of claim 13, wherein selecting a set of high-score images for the property comprises:

selecting a set of high-score images for the property as each of the plurality of images of the property that has an image score above a threshold value.

15. The non-transitory computer-readable storage medium of claim 13, wherein receiving image preference criteria further comprises:

receiving image preference criteria from an image preference criteria database containing a plurality of image preference criteria.

\* \* \* \* \*